United States Patent
Aoki

(10) Patent No.: US 9,479,691 B2
(45) Date of Patent: Oct. 25, 2016

(54) IMAGE CAPTURE DEVICE AND FOCUS CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/016,929

(22) Filed: Feb. 5, 2016

(65) Prior Publication Data

US 2016/0156836 A1 Jun. 2, 2016

Related U.S. Application Data

(63) Continuation of application No. PCT/JP2014/065285, filed on Jun. 10, 2014.

(30) Foreign Application Priority Data

Aug. 22, 2013 (JP) ................. 2013-172449

(51) Int. Cl.
*H04N 5/232* (2006.01)
*H04N 5/369* (2011.01)
(Continued)

(52) U.S. Cl.
CPC ............ *H04N 5/23212* (2013.01); *G02B 7/34* (2013.01); *H04N 5/23293* (2013.01); *H04N 5/3696* (2013.01); *G03B 13/36* (2013.01)

(58) Field of Classification Search
CPC ........... H04N 5/23212; H04N 5/3532; H04N 5/3696; H04N 2201/0084; G02B 7/34
USPC .................. 348/241, 242, 340, 345, 390
See application file for complete search history.

(56) References Cited

U.S. PATENT DOCUMENTS 6,829,008 B1 * 12/2004 Kondo .................. G02B 7/34
　　　　　　　　　　　　　　　　　348/302
8,704,940 B2 * 4/2014 Aoki ..................... G02B 7/34
　　　　　　　　　　　　　　　　　348/241
(Continued)

FOREIGN PATENT DOCUMENTS

JP　　2010-139942 A　　6/2010
JP　　2010-204294 A　　9/2010
WO　WO 2013/047160 A1　4/2013

OTHER PUBLICATIONS

International Search Report, issued in PCT/JP2014/065285, dated Jul. 15, 2014.
(Continued)

*Primary Examiner* — Lin Ye
*Assistant Examiner* — Chriss Yoder, III
(74) *Attorney, Agent, or Firm* — Birch, Stewart, Kolasch & Birch, LLP

(57) ABSTRACT

Provided are an image capture device and a focus control method capable of performing reliability determination based on a phase difference AF method at high speed. A phase difference AF processing unit 19 of a digital camera performs a correlation operation of two images captured by a pixel pair P1, performs a correlation operation of two images captured by a pixel pair P2, performs a correlation operation of two images captured by a pixel pair P3, and performs a correlation operation of two images captured by a pixel pair P4. A system control unit 11 determines reliability of a focus control based on the phase difference AF method using detection signals of respective pixels with respect to each of the pixel pairs P1 to P4 based on four correlation operation results.

20 Claims, 16 Drawing Sheets

(51) Int. Cl.
*G02B 7/34* (2006.01)
*G03B 13/36* (2006.01)

(56) References Cited

U.S. PATENT DOCUMENTS

| | | | |
|---|---|---|---|
| 8,982,271 B2* | 3/2015 | Aoki | G02B 7/34 |
| | | | 348/241 |
| 9,106,826 B2* | 8/2015 | Aoki | H04N 5/23212 |
| 2010/0150538 A1 | 6/2010 | Ono et al. | |
| 2011/0096212 A1* | 4/2011 | Oikawa | G03B 13/36 |
| | | | 348/273 |
| 2014/0211059 A1* | 7/2014 | Aoki | G02B 7/34 |
| | | | 348/311 |

OTHER PUBLICATIONS

Written Opinion of the International Searching Authority, issued in PCT/JP2014/065285, dated Jul. 15, 2014.
International Preliminary Report on Patentability, issued in PCT/JP2014/065285, dated Feb. 23, 2016 (Form PCT/IB/373).
International Search Report, issued in PCT/JP2014/065285, dated Jul. 15, 2014 (Form PCT/ISA/210).
Written Opinion of the International Searching Authority dated Jul. 15, 2014, issued in PCT/JP2014/065285 (Form PCT/ISA/237).

* cited by examiner

IMAGE CAPTURE DEVICE AND FOCUS CONTROL METHOD

CROSS-REFERENCE TO RELATED APPLICATIONS

This application is a Continuation of PCT International Application No. PCT/JP2014/065285 filed on Jun. 10, 2014, which claims priority under 35 U.S.C §119 (a) to Japanese Patent Application No. 2013-172449 filed on Aug. 22, 2013. Each of the above application(s) is hereby expressly incorporated by reference, in its entirety, into the present application.

BACKGROUND OF THE INVENTION

1. Field of the Invention

The present invention relates to an image capture device and a focus control method.

2. Description of the Related Art

In recent years, according to increase in resolution of a solid-state imaging element such as a charge coupled device (CCD) image sensor or a complementary metal oxide semiconductor (CMOS) image sensor, demand for an information device having an imaging function, such as a digital still camera, a digital video camera, a mobile phone such as a smart phone, or a personal digital assistant (PDA) has rapidly increased. The information device having the above-mentioned imaging function is referred to as an image capture device.

In such an image capture device, as a focus control method of focusing on a main subject, a contrast auto focus (AF) method or a phase difference AF method (for example, see WO 2013/047160) is employed. Since the contrast AF method and the phase difference AF method have advantages of their own, an image capture device using both the methods in combination has been also provided (for example, see JP2010-139942A and JP2010-204294A).

It is known that the phase difference AF method has low reliability when a high-frequency subject is present. Thus, JP2010-204294A discloses a technique that determines whether a periodic pattern is present on a subject from analysis of frequencies of normal pixels and performs a focus control by the contrast AF method when the periodic pattern is present.

SUMMARY OF THE INVENTION

As disclosed in JP2010-204294A, when determining the reliability of the phase difference AF method using detection signals of the normal pixels, it takes time for the determination, and thus, time until focusing on a main subject is performed becomes long.

The invention has been made in consideration of the above problems, and an object of the invention is to provide an image capture device and a focus control method capable of performing reliability determination based on a phase difference AF method at high speed.

According to an aspect of the invention, there is provided an image capture device that has an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams, and the image capture device includes: a focus control unit that performs a focus control of the imaging optical system using a phase difference AF method that uses detection signals of the first signal detection unit and the second signal detection unit. The image capture device includes a matching rate generation unit that generates a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generates a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, generates a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair, and generates a fourth matching rate which is a matching rate of two images captured by a fourth pair which is a pair in which the second signal detection unit that forms a pair together with the first signal detection unit in the second pair is changed to form a combination different from that of the pair for calculating the second matching rate, using detection signals of the respective signal detection units of the fourth pair. Further, the image capture device includes a reliability determination unit that determines reliability of the focus control based on the phase difference AF method that uses the detection signals of the respective signal detection units of each of the first pair, the second pair, the third pair, and the fourth pair based on the first matching rate, the second matching rate, the third matching rate, and the fourth matching rate.

According to another aspect of the invention, there is provided a focus control method in an image capture device that includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams, and the focus control method includes: a focus control step of performing a focus control of the imaging optical system using a phase difference AF method that uses detection signals of the first signal detection unit and the second signal detection unit. The focus control method includes a matching rate generation step of generating a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generating a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, and generating a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair. Further, the focus control method includes a reliability determination step of determining reliability of the focus control based on the phase difference AF method that uses the detection signals of the respective signal detection units of each of the first pair, the second pair, and the third pair based on the first matching rate, the second matching rate, and the third matching rate.

According to the invention, it is possible to provide an image capture device and a focus control method capable of performing reliability determination based on a phase difference AF method at high speed.

DESCRIPTION OF THE PREFERRED EMBODIMENTS

Hereinafter, embodiments of the invention will be described with reference to the accompanying drawings.

Figure 1:
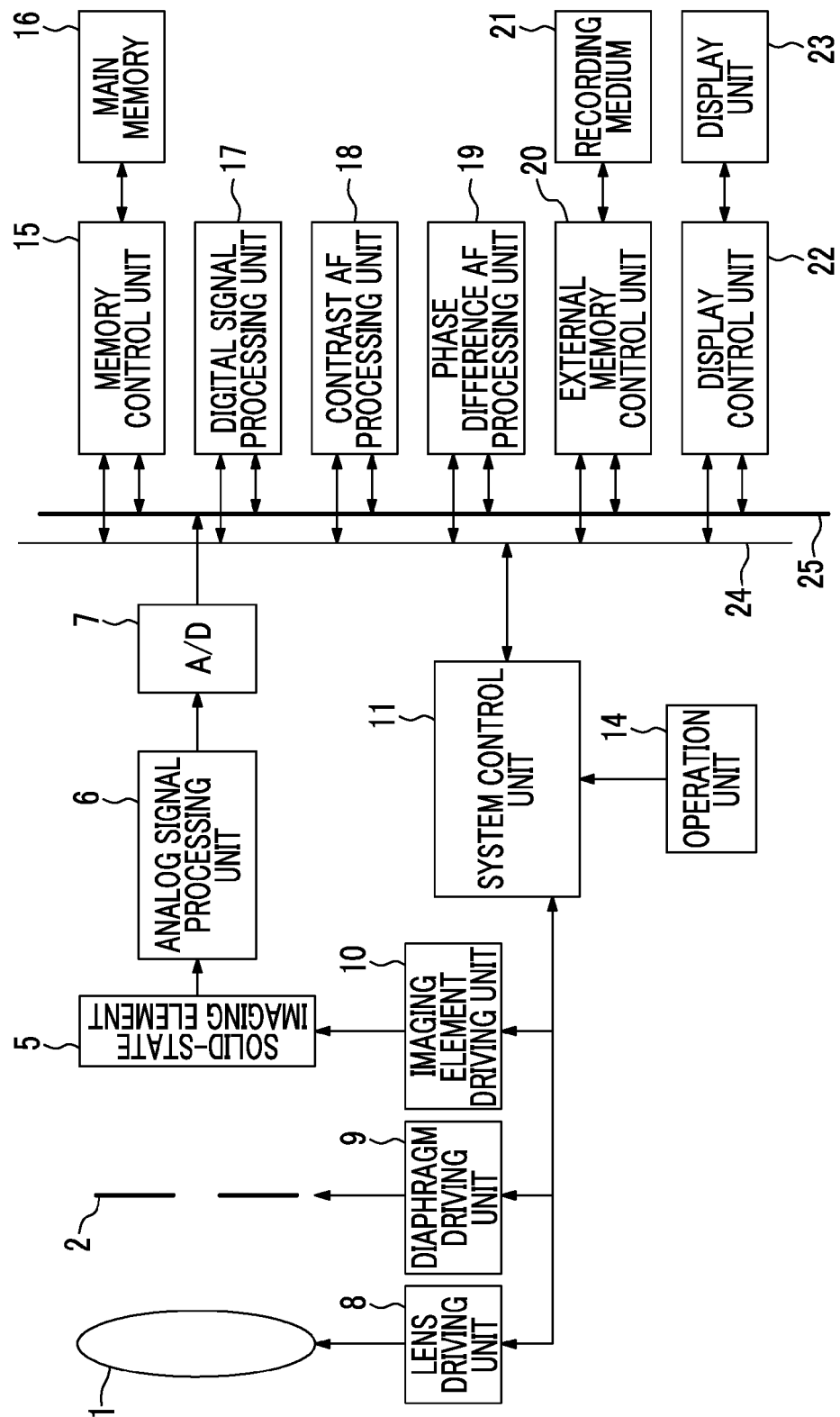
FIG. 1 is a diagram illustrating a schematic configuration of a digital camera which is an example of an image capture device illustrating an embodiment of the invention.

FIG. 1 is a diagram illustrating a schematic configuration of a digital camera which is an example of an image capture device for describing a first embodiment of the invention.

The digital camera shown in FIG. 1 includes a lens device that includes an imaging lens 1 that includes a focus lens, a zoom lens, or the like and a diaphragm 2. The lens device forms an imaging optical system. The lens device may be detachably mounted to a camera main body, or may be fixed thereto. It is sufficient if the imaging lens 1 includes at least the focus lens.

The camera main body includes a solid-state imaging element 5 of a CCD type, a CMOS type, or the like that images a subject through the lens device, an analog signal processing unit 6 that is connected to an output end of the solid-state imaging element 5 and performs analog signal processing such as a correlated double sampling process, and an A/D conversion circuit 7 that converts an analog signal output from the analog signal processing unit 6 into a digital signal. The analog signal processing unit 6 and the A/D conversion circuit 7 are controlled by a system control unit 11. The analog signal processing unit 6 and the A/D conversion circuit 7 may be built in the solid-state imaging element 5.

The system control unit 11 that generally controls the entirety of an electric control system of the digital camera controls a lens driving unit 8 to adjust the position of the focus lens included in the imaging lens 1, or to adjust the position of the zoom lens included in the imaging lens 1. Further, the system control unit 11 controls the degree of opening of the diaphragm 2 through a diaphragm driving unit 9 to adjust an exposure value.

Further, the system control unit 11 drives the solid-state imaging element 5 through an imaging element driving unit 10, and outputs a subject image captured through the imaging lens 1 as a captured image signal. An instruction signal from a user is input to the system control unit 11 through an operation unit 14.

The system control unit 11 selects any one of a contrast AF processing unit 18 and a phase difference AF processing unit 19, and performs a focus control of the imaging lens 1 according to a focusing position determined by the selected processing unit, as described later.

Further, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, the contrast AF processing unit 18 that determines a focusing position according to a contrast AF method, the phase difference AF processing unit 19 that determines a focusing position according to a phase difference AF method, an external memory control unit 20 to which a detachable recording medium 21 is connected, and a display control unit 22 to which a display unit 23 mounted on a rear surface or the like of the camera is connected.

The memory control unit 15, the digital signal processing unit 17, the contrast AF processing unit 18, the phase difference AF processing unit 19, the external memory control unit 20, and the display control unit 22 are connected to each other through a control bus 24 and a data bus 25, and are controlled by instructions from the system control unit 11.

Figure 2:
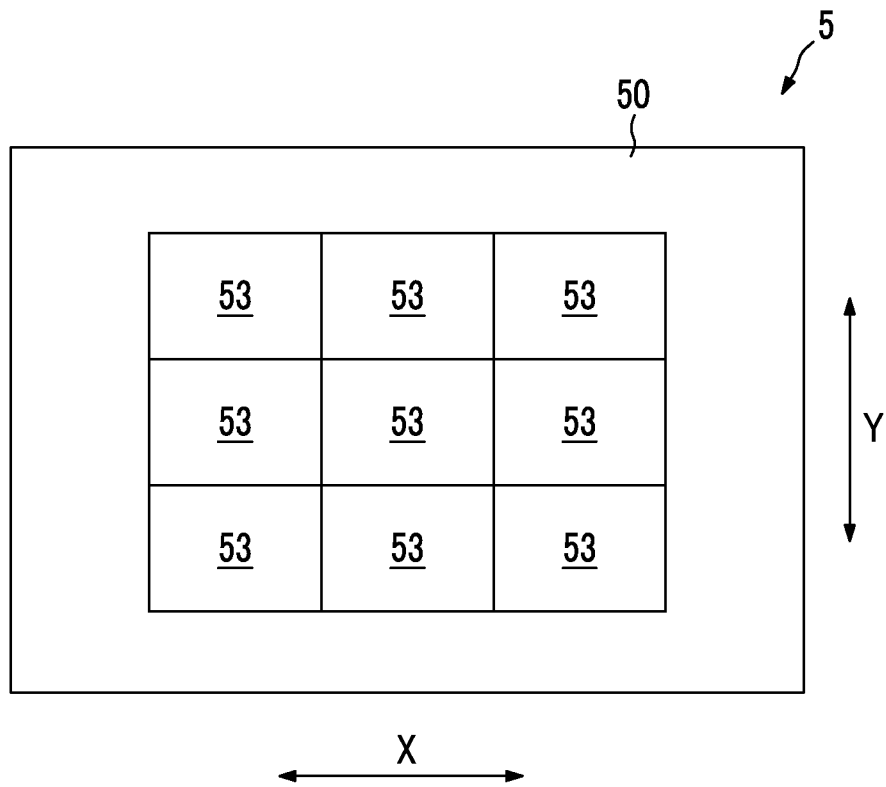
FIG. 2 is a schematic plan view illustrating an overall configuration of a solid-state imaging element 5 mounted on the digital camera shown in FIG. 1.

FIG. 2 is a schematic plan view illustrating an overall configuration of the solid-state imaging element 5 mounted on the digital camera shown in FIG. 1.

The solid-state imaging element 5 includes a light receiving surface 50 on which multiple pixels which are arranged in a two-dimensional pattern in a row direction X and in a column direction Y orthogonal to the row direction X are disposed. Nine AF areas 53 which are target areas for focusing are provided in the light receiving surface 50 in the example of FIG. 2.

The AF area 53 is an area that includes an imaging pixel and a phase difference detection pixel as pixels.

In a portion excluding the AF areas 53 on the light receiving surface 50, only imaging pixels are disposed in a portion where the AF area 53 is excluded on the light receiving surface 50. The AF areas 53 may be provided on the light receiving surface 50 without a gap.

Figure 3:
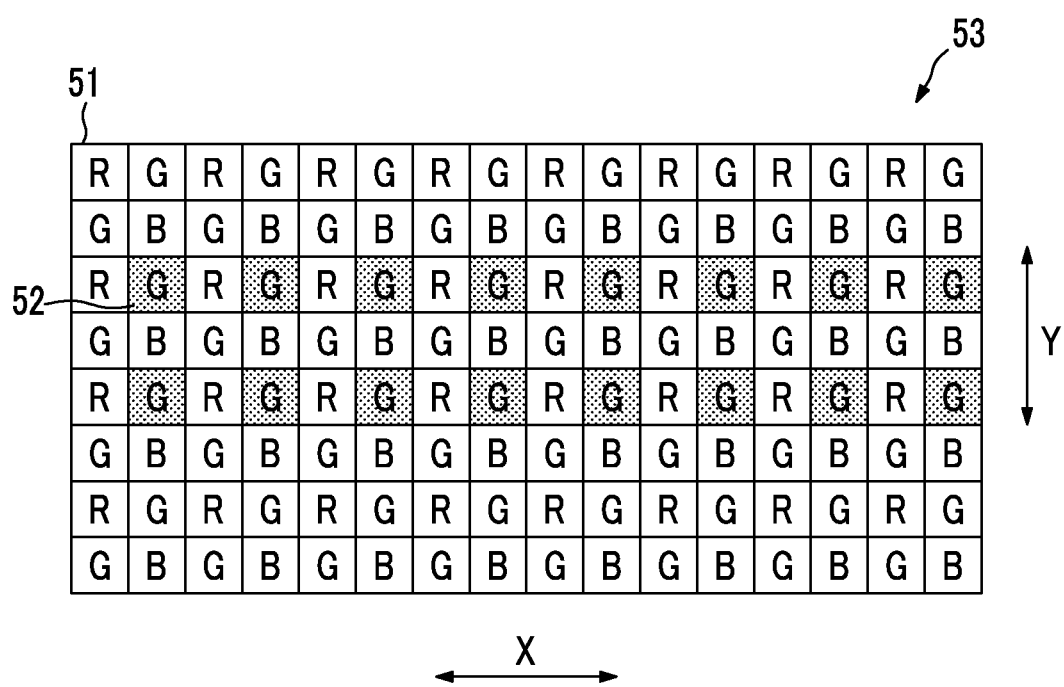
FIG. 3 is a partially enlarged view of a single AF area 53 shown in FIG. 2.

FIG. 3 is a partially enlarged view of a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The array of the color filters is a Bayer array over the entirety of the light receiving surface 50.

In the AF area 53, a part of the G pixels 51 (shaded pixels 51 in FIG. 3) are used as the phase difference detection pixels 52. In the example of FIG. 3, each G pixel 51 in an arbitrary pixel row among pixel rows including the R pixels 51 and the G pixels 51, and the G pixel 51 which has the same color as that of each pixel 51 and is closest to each G pixel 51 in the column direction Y are used as the phase difference detection pixels 52.

Figure 4:
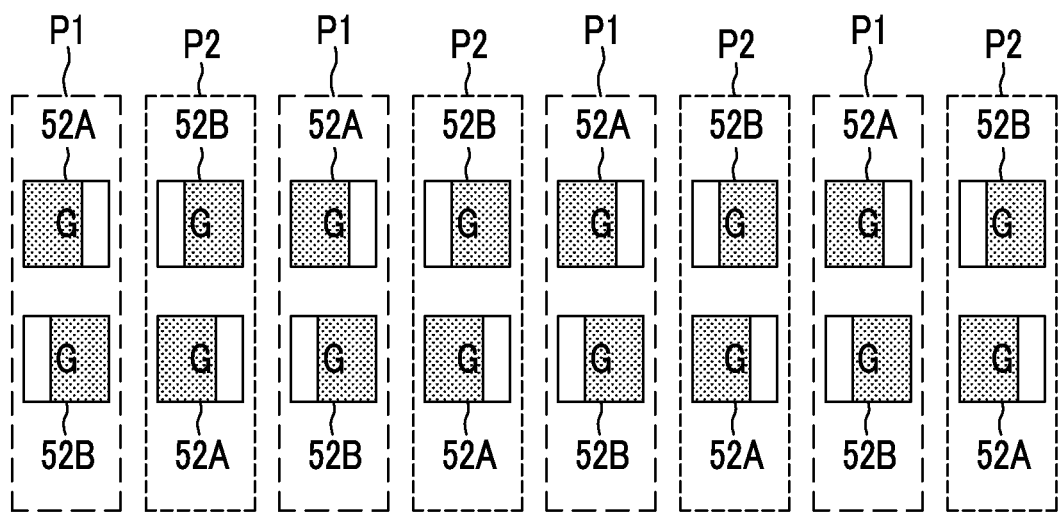
FIG. 4 is a diagram illustrating only a phase difference detection pixel 52 shown in FIG. 3.

FIG. 4 is a diagram illustrating only the phase difference detection pixels 52 shown in FIG. 3.

As shown in FIG. 4, the phase difference detection pixels 52 include two types of phase difference detection pixels 52A and phase difference detection pixels 52B.

The phase difference detection pixel 52A is a signal detection unit (first signal detection unit) that receives one beam among a pair of beams that passes through different portions in a pupil region of the imaging lens 1, and detects a signal depending on the intensity of received light.

The phase difference detection pixel 52B is a signal detection unit (second signal detection unit) that receives the other beam among the pair of beams, and detects a signal depending on the intensity of received light.

In the AF area 53, plural pixels 51 other than the phase difference detection pixels 52A and 52B are imaging pixels, and each imaging pixel receives the pair of beams that passes through the imaging lens 1, and detects a signal depending on the intensity of received light.

A light shielding film is provided above the photoelectric conversion unit of each pixel 51, and an opening for defining a light receiving area of the photoelectric conversion unit is formed on the light shielding film.

The center of the opening of the imaging pixel 51 matches the center of the photoelectric conversion unit of the imaging pixel 51. On the other hand, the center of the opening (outline portion in FIG. 4) of the phase difference detection pixel 52A is eccentric rightward with respect to the center of the photoelectric conversion unit of the phase difference detection pixel 52A. Further, the center of the opening (outline portion in FIG. 4) of the phase difference detection pixel 52B is eccentric leftward with respect to the center of the photoelectric conversion unit of the phase difference detection pixel 52B.

With such a configuration, it is possible to detect a phase difference in the row direction X in an image captured by each of two pixel groups, that is, a pixel group that includes the phase difference detection pixels 52A which are positioned in an arbitrary row and a pixel group that includes the phase difference detection pixels 52B which are adjacently disposed at the same distance in the same direction with respect to each of the phase difference detection pixels 52A of the former pixel group.

As shown in FIG. 4, in the AF area 53, at least one pair line in which a pixel pair P1 that includes the phase difference detection pixel 52A and the phase difference detection pixel 52B disposed at a predetermined distance in a direction orthogonal to the phase difference detection direction (row direction X) with respect to the phase difference detection pixel 52A and a pixel pair P2 having a reverse positional relationship with respect to the positional relationship of the phase difference detection pixel 52A and the phase difference detection pixel 52B in the pixel pair P1 are alternately disposed in the X direction is provided.

It can be said that the pair line includes a first pair of a first signal detection unit group (phase difference detection pixels 52A of the entire pixel pairs P1) including plural phase difference detection pixels 52A arranged along the phase difference detection direction and a signal detection unit group (phase difference detection pixels 52B of the entire pixel pairs P1) including the phase difference detection pixels 52B arranged at the same distance (distance corresponding to one pixel) in the same direction (downward direction) with respect to the respective phase difference detection pixels 52A of the first signal detection unit group; and a second pair of a second signal detection unit group (phase difference detection pixels 52A of the entire pixel pairs P2) including plural phase difference detection pixels 52A arranged at the same distance in the same direction (on a diagonally lower right side) with respect to the respective phase difference detection pixels 52A of the first signal detection unit group and arranged along the detection direction and a signal detection unit group (phase difference detection pixels 52B of the entire pixel pairs P2) including the phase difference detection pixels 52B arranged at the same distance (distance corresponding to one pixel) in an upward direction which is different from the downward direction with respect to the respective phase difference detection pixels 52A of the second signal detection unit group.

The phase difference AF processing unit 19 shown in FIG. 1 calculates a phase difference which is a relative position deviation amount of two images formed by the pair of beams using a detection signal group read from the phase difference detection pixels 52A and the phase difference detection pixels 52B disposed in one AF area 53 selected by a user operation or the like from among nine AF areas 53.

Further, the phase difference AF processing unit 19 calculates a focus adjustment state of the imaging lens 1 based on the phase difference. Here, the phase difference AF processing unit 19 calculates a deviation amount from a focused state and a deviation direction from the focused state, that is, a defocus amount. The phase difference AF processing unit 19 determines a focusing position of the focus lens from the defocus amount. The phase difference AF processing unit 19 and the system control unit 11 function as a focus control unit that performs a focus control of an imaging optical system according to the phase difference AF method using detection signals of the phase difference detection pixel 52A and the phase difference detection pixel 52B.

The contrast AF processing unit 18 shown in FIG. 1 analyzes an image captured by one AF area 53 selected by a user operation or the like from among nine AF areas 53, and determines a focusing position of the imaging lens 1 according to a known contrast AF method.

That is, the contrast AF processing unit 18 calculates, while moving the position of the focus lens of the imaging lens 1 under the control of the system control unit 11, contrast (brightness difference) of images obtained at respective movement positions (plural positions). Thus, the contrast AF processing unit 18 determines the position of the focus lens where the contrast becomes maximum as the focusing position.

Instead of one AF area 53, plural AF areas 53 which are continuously arranged may be selected.

In the digital camera of this embodiment, if there is an instruction for performing AF, the system control unit 11 performs the focus control based on the phase difference AF method or the focus control based on the contrast AF method. Here, the system control unit 11 determines which method is to be used for performing the focus control, and performs the focus control using an optimal method. Hereinafter, an operation of the digital camera after an AF instruction is performed will be described.

Figure 5:
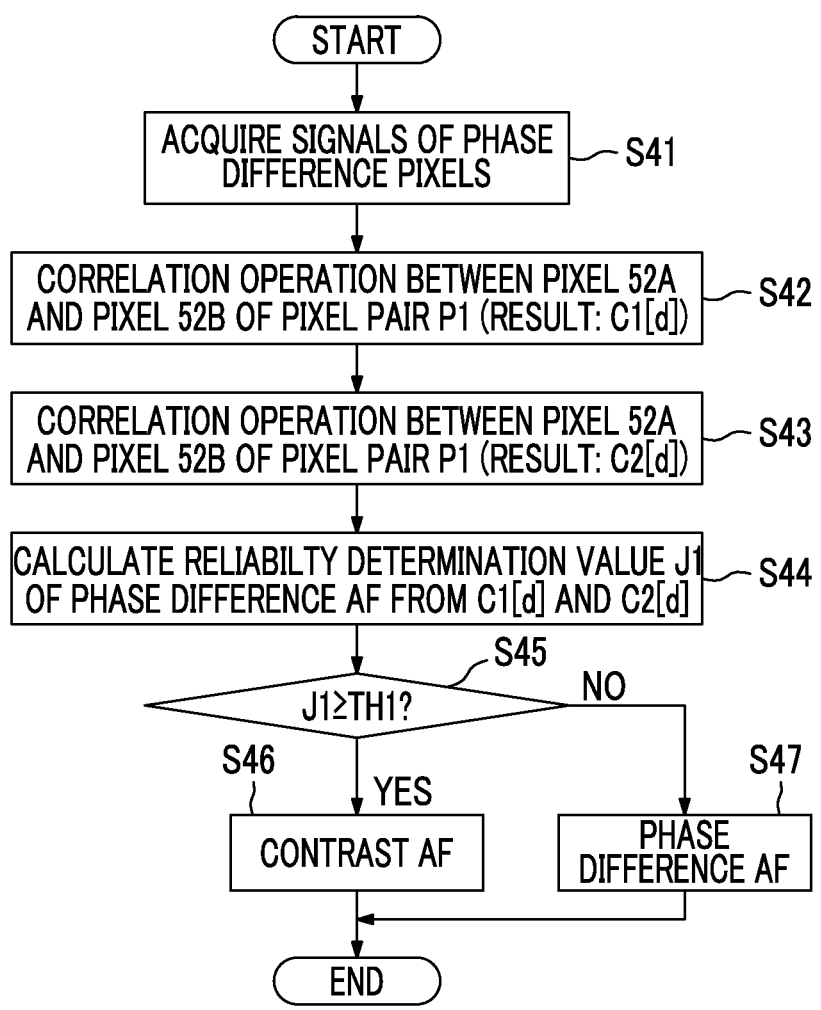
FIG. 5 is a flowchart illustrating an AF operation of the digital camera shown in FIG. 1.

FIG. 5 is a flowchart illustrating an AF operation of the digital camera shown in FIG. 1.

If there is an AF instruction, first, the phase difference AF processing unit 19 acquires detection signals of the phase difference detection pixels 52A and the phase difference detection pixels 52B disposed in a selected AF area 53 (step S41).

Then, the phase difference AF processing unit 19 performs a correlation operation between detection signal groups of the phase difference detection pixels 52A and the phase difference detection pixels 52B of the pixel pairs P1 that form one pair line, among the acquired detection signals (step S42).

Specifically, when data on one detection signal group is represented as A[1], . . . , and A[k] and data on the other detection signal group is represented as B[1], . . . , and B[k], an area C[d] surrounded by two data waveforms calculated by the following expression when two sets of data are deviated by a shift amount "d" is calculated.

$$C[d] = \sum_{n=1}^{k} (A[n+d] - B[n])^2 \quad (1)$$

$$d = -L, \ldots, -2, -1, 0, 1, 2, \ldots, L$$

Hereinafter, the result of the correlation operation in step S42 is represented as C1[d]. The correlation operation result C1[d] is a value indicating a matching rate of images captured by each phase difference detection pixel 52A and each phase difference detection pixel 52B of the pixel pair P1.

Subsequently, the phase difference AF processing unit 19 performs a correlation operation between detection signal groups of the phase difference detection pixels 52A and the phase difference detection pixels 52B of the pixel pairs P2 that form one pair line, among the acquired detection signals (step S43).

The correlation operation result is represented as C2[d]. The correlation operation result C2[d] is a value indicating a matching rate of images captured by each phase difference detection pixel 52A and each phase difference detection pixel 52B of the pixel pair P2.

Next, the phase difference AF processing unit 19 generates a reliability determination value J1 for determining reliability of the focus control based on the phase difference AF method using detection signals of the phase difference detection pixels 52A and the phase difference detection pixels 52B included in one pair line, using the correlation operation result C1[d] and the correlation operation result C2[d] (step S44).

When the frequency of a subject image formed in the pair line is low, a shape of a graph in which a transverse axis represents the shift amount d and a longitudinal axis represents C[d] is approximately the same between C1[d] and C2[d]. However, when the frequency of the subject image formed in the pair line is high, the shape of the graph greatly varies between C1[d] and C2[d].

In this way, from the fact that the correlation operation results are different between two pixel pairs P1 and P2 even in the area where the same subject image is formed, it can be determined that there is a high possibility that the correlation operation results are erroneous, and that the reliability of the focusing position determined using the detection signals of the phase difference detection pixels in the pair line is low.

Then, the phase difference AF processing unit 19 compares the shape of the graph based on C1[d] with the shape of the graph based on C2[d] to generate the reliability determination value J1.

Specifically, the phase difference AF processing unit 19 generates the reliability determination value J1 by performing an operation of the following Expression (2).

$$J1 = \frac{\sum_{d=-L}^{L} |C1[d] - C2[d]|}{\sum_{d=-L}^{L} C1[d] + \sum_{d=-L}^{L} C2[d]} \quad (2)$$

A numerator of Expression (2) becomes a small value when the shape of the graph based on C1[d] and the shape of the graph based on C2[d] are similar to each other, and becomes a large value when the two shapes are different from each other.

Accordingly, the reliability determination value J1 is generated in step S44, and then, the system control unit 11 that functions as a reliability determination unit compares the reliability determination value J1 with a predetermined threshold value TH1. When J1 is equal to or greater than the threshold value TH1 (step S45: YES), the system control unit 11 determines that the reliability of the focus control based on the phase difference AF method is low. When the reliability determination value J1 is smaller than the threshold value TH1 (step S45: NO), the system control unit 11 determines that the reliability of the focus control based on the phase difference AF method is high.

When it is determined that the reliability of the focus control based on the phase difference AF method is low (step S45: YES), the system control unit 11 selects the contrast AF processing unit 18, and determines the focusing position using the contrast AF processing unit 18. Further, the system control unit 11 performs the focus control of the imaging lens 1 according to the determined focusing position (step S46).

Further, when it is determined that the reliability of the focus control based on the phase difference AF method is high (step S45: NO), the system control unit 11 selects the phase difference AF processing unit 19, and determines the focusing position using the phase difference AF processing unit 19. Further, the system control unit 11 performs the focus control of the imaging lens 1 according to the determined focusing position (step S47).

When there are plural pair lines in the selected AF area 53, the phase difference AF processing unit 19 generates the reliability determination value J1 by performing the processes of steps S42 to S44 for each pair line.

Further, when there is at least one pair line where the reliability determination value J1 is smaller than the threshold value TH1 among the plural pair lines, the system control unit 11 determines that the reliability of the focus control based on the phase difference AF method is high with respect to the selected AF area 53. In addition, in step S47, the system control unit 11 determines the focusing position using detection signals read from the pair line where the reliability determination value J1 is smaller than the threshold value TH1.

That is, the system control unit 11 performs the focus control based on the phase difference AF method using detection signals of the phase difference detection pixels disposed in pair lines other than the pair line for which it is determined that the reliability is lower than the threshold value.

Here, when there are plural pair lines where the reliability determination value J1 is smaller than the threshold value TH1, the phase difference AF processing unit 19 determines the focusing position based on an average of defocus amounts calculated for each pair line, for example.

Further, when there is no pair line where the reliability determination value J1 is smaller than the threshold value TH1 among the plural pair lines, the system control unit 11 determines that the reliability of the focus control based on the phase difference AF method is low with respect to the selected AF area 53.

As described above, according to the digital camera shown in FIG. 1, since it is possible to determine the reliability of the focus control based on the phase difference AF method using only the detection signals of the phase difference detection pixels 52A and 52B, it is possible to perform reliability determination at high speed. Further, it is possible to omit reading of the detection signals of the imaging pixels in the reliability determination, and thus, it is possible to reduce power consumption.

Further, according to the digital camera shown in FIG. 1, in step S47, since the phase difference AF processing unit 19 can determine the focusing position using the correlation operation results C1[d] and C2[d] which are previously calculated, it is possible to perform the phase difference AF at high speed.

As a method of determining the focusing position in step S47, a method of determining the defocus amount based on the correlation operation result C1[d] and determining the focusing position according to the defocus amount, a method of determining the defocus amount based on the correlation operation result C2[d] and determining the focusing position according to the defocus amount, a method of determining the focusing position according to, for example, an average value of two defocus amounts, or the like may be employed.

Figure 6:
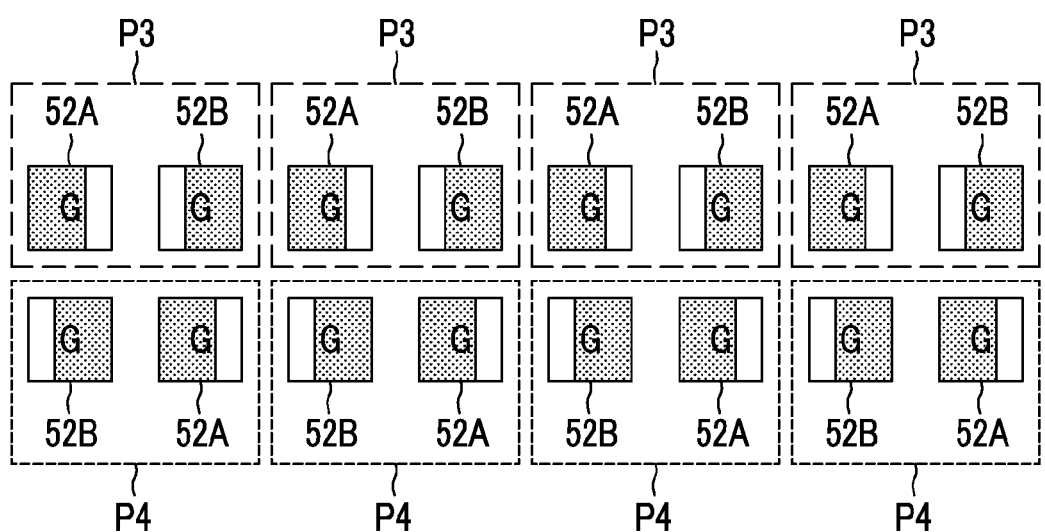
FIG. 6 is a diagram illustrating a modification example of a pixel pair set in a pair line.

Hereinbefore, an example in which the pair line disposed in the AF area 53 is a line including the pixel pairs P1 and the pixel pairs P2 is shown, but as shown in FIG. 6, it can also be said that the pair line is a line including pixel pairs P3 and pixel pairs P4.

That is, the pair line may be configured to include a line in which the pixel pairs P3 including the phase difference detection pixel 52A and the phase difference detection pixel 52B disposed at a predetermined distance with respect to the phase difference detection pixel 52A in the phase difference detection direction (row direction X) are arranged in the row direction X and a line in which the pixel pairs P4 having a reverse positional relationship with respect to the positional relationship of the phase difference detection pixel 52A and the phase difference detection pixel 52B in the pixel pair P3 are arranged disposed in the X direction.

When the pixel pairs P3 and P4 are set in the pair line as shown in FIG. 6, the phase difference AF processing unit 19 performs a correlation operation between detection signal groups of the phase difference detection pixels 52A and 52B of the pixel pair P3, in step S42 of FIG. 5, and performs a correlation operation between detection signal groups of the phase difference detection pixels 52A and 52B of the pixel pair P4, in step S43 of FIG. 5. Further, in step S44, the reliability determination value J1 is generated based on two correlation operation results.

Thus, it is possible to perform the reliability determination of the focus control based on the phase difference AF method using only the detection signals of the phase difference detection pixels.

As shown in FIGS. 4 and 6, even in the same pair line, it is possible to generate the reliability determination value using two patterns in a case where the pixel pairs P1 and P2 are set and in a case where the pixel pairs P3 and P4 are set.

Hereinbefore, an example in which it is determined whether the phase difference AF is to be performed based on the reliability determination value generated using any one pattern among the two patterns is shown. On the other hand, it may also be determined whether the phase difference AF is to be performed based on the reliability determination value generated using each of two patterns. Hereinafter, the description will be performed with reference to the flowchart.

Figure 7:
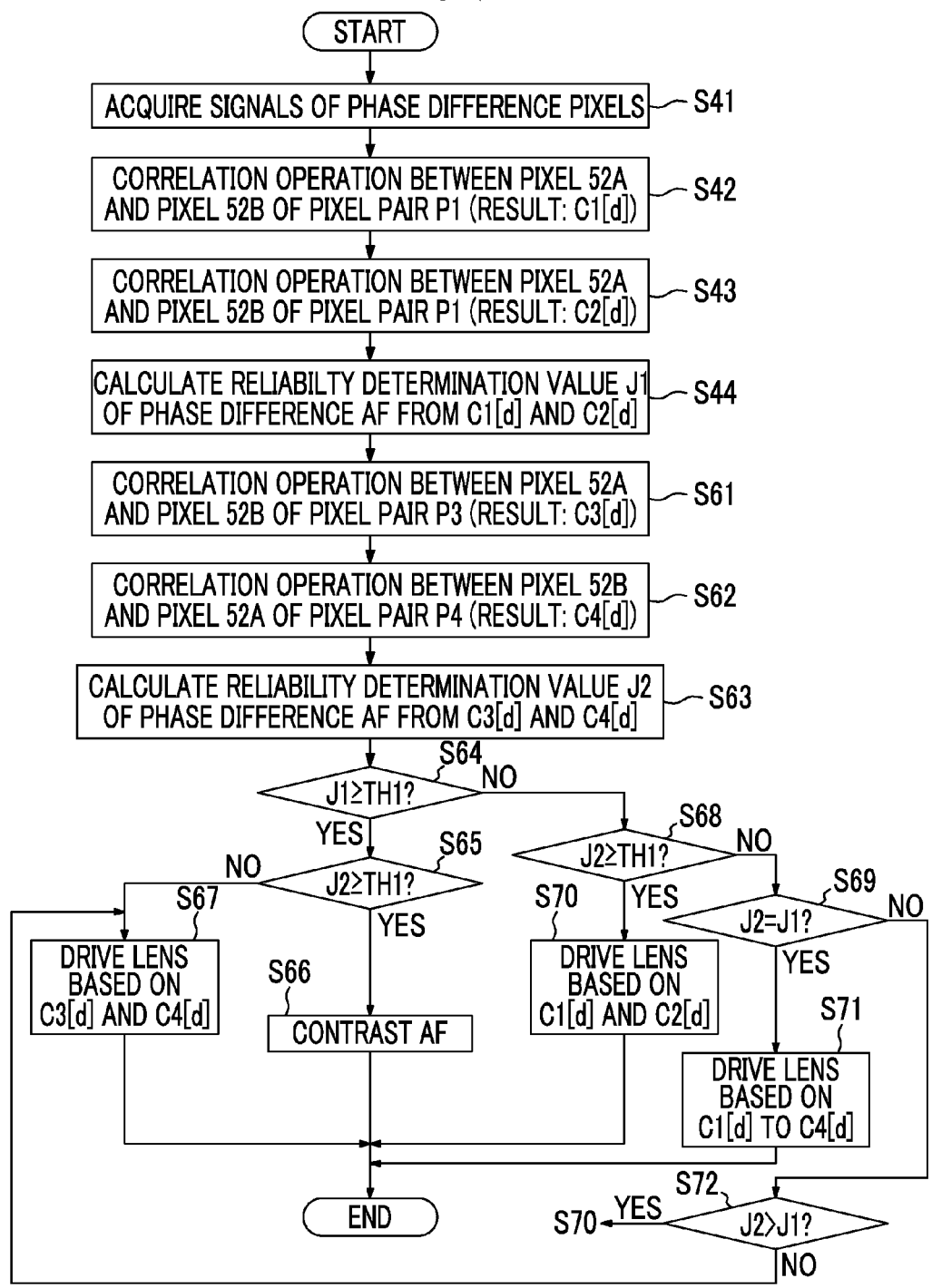
FIG. 7 is a flowchart illustrating a modification example of the AF operation of the digital camera shown in FIG. 1.

FIG. 7 is a flowchart illustrating a modification example of the AF operation of the digital camera shown in FIG. 1. In FIG. 7, the same reference numerals are given to the same processes as in FIG. 4, and description thereof will not be repeated.

After the reliability determination value J1 is generated in step S44, the phase difference AF processing unit 19 performs a correlation operation between detection signal groups of the phase difference detection pixels 52A and the phase difference detection pixels 52B of the pixel pairs P3 that form one pair line, among the detection signals acquired in step S41 (step S61).

The correlation operation result is represented as C3[d]. The correlation operation result C3[d] is a value indicating a matching rate of images captured by each phase difference detection pixel 52A and each phase difference detection pixel 52B of the pixel pair P3.

Then, the phase difference AF processing unit 19 performs a correlation operation between detection signal groups of the phase difference detection pixels 52A and the phase difference detection pixels 52B of the pixel pairs P4 that form one pair line, among the detection signals acquired in step S41 (step S62). The correlation operation result is represented as C4[d].

The correlation operation result C4[d] is a value indicating a matching rate of images captured by each phase difference detection pixel 52A and each phase difference detection pixel 52B of the pixel pair P4.

Then, the phase difference AF processing unit 19 generates a reliability determination value J2 for determining reliability of a focus control based on the phase difference AF method using detection signals of the phase difference detection pixels 52A and the phase difference detection pixels 52B included in one pair line, using the correlation operation result C3[d] and the correlation operation result C4[d] (step S63).

Specifically, the phase difference AF processing unit 19 generates the reliability determination value J2 by performing the operation of the following Expression (3).

$$J2 = \frac{\sum\limits_{d=-L}^{L} |C3[d] - C4[d]|}{\sum\limits_{d=-L}^{L} C3[d] + \sum\limits_{d=-L}^{L} C4[d]} \quad (3)$$

Figure 8:
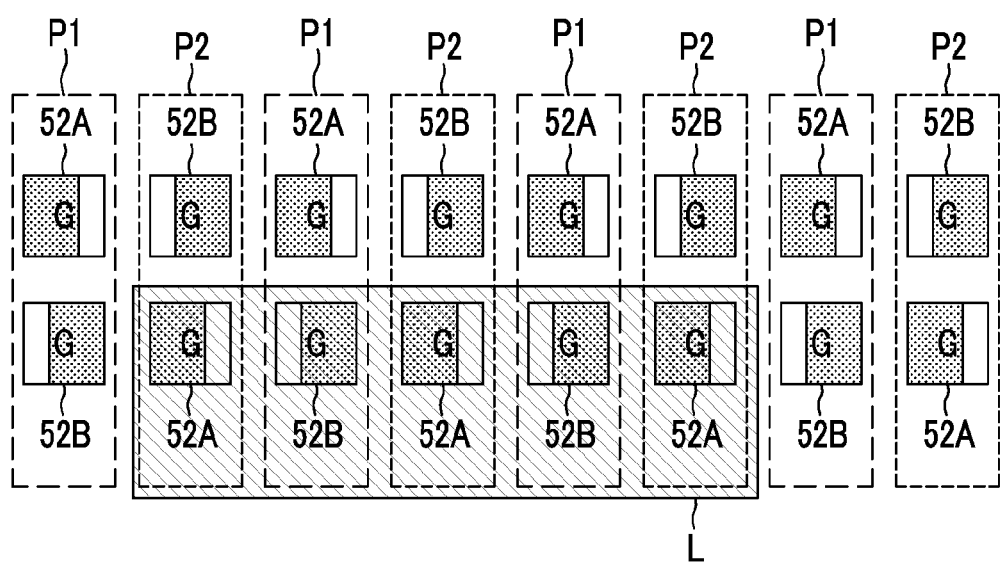
FIG. 8 is a diagram illustrating an example of a straight line L that extends in a phase difference detection direction.

For example, as shown in FIG. 8, a case where the straight line L that extends in the phase difference detection direction is formed with respect to a part of the pair line may be considered. In this case, since the matching rate (C1[d]) of two images captured by the phase difference detection pixels 52A and 52B of the pixel pair P1 and the matching rate (C2[d]) of two images captured by the phase difference detection pixels 52A and 52B of the pixel pair P2 become similar values, the reliability determination value J1 becomes a small value.

On the other hand, since the matching rate (C3[d]) of two images captured by the phase difference detection pixels 52A and 52B of the pixel pair P3 and the matching rate (C4[d]) of two images captured by the phase difference detection pixels 52A and 52B of the pixel pair P4 are greatly different from each other, the reliability determination value J2 becomes a large value.

Accordingly, if the focusing position is determined using at least one of the correlation operation results C1[d] and C2[d], it is possible to perform the phase difference AF with high reliability.

After step S63, the system control unit 11 determines whether the focus control based on the phase difference AF method is to be performed or the focus control based on the contrast AF method is to be performed, based on the reliability determination value J1 and the reliability determination value J2.

Specifically, when J1≥TH1 (step S64: YES) and J2≥TH1 (step S65: YES), the system control unit 11 determines that the reliability of the focusing position determined using at least one of the correlation operation result C1[d] and the correlation operation result C2[d] and the reliability of the focusing position determined using at least one of the correlation operation result C3[d] and the correlation operation result C4[d] are all not high, and selects the contrast AF processing unit 18 to perform the focus control (step S66).

When J1≥TH1 (step S64: YES) and J2<TH1 (step S65: NO), the system control unit 11 determines that the reliability is high with respect to the focusing position determined using at least one of the correlation operation result C3[d] and the correlation operation result C4[d], and selects the phase difference AF processing unit 19.

Then, the system control unit 11 causes the phase difference AF processing unit 19 to determine the focusing position based on at least one of the correlation operation result C3[d] and the correlation operation result C4[d], and moves the focus lens to the determined focusing position (step S67).

When J1<TH1 (step S64: NO) and J2≥TH1 (step S68: YES), the system control unit 11 determines that the reliability is high with respect to the focusing position determined using at least one of the correlation operation result C1[d] and the correlation operation result C2[d], and selects the phase difference AF processing unit 19.

Further, the system control unit 11 causes the phase difference AF processing unit 19 to determine the focusing position based on at least one of the correlation operation result C1[d] and the correlation operation result C2[d], and moves the focus lens to the determined focusing position (step S70).

When J1<TH1 (step S64: NO) and J2<TH1 (step S68: NO), and when J2=J1 (step S69: YES), the system control unit 11 determines that the reliability is high with respect to the focusing position determined using at least one of the correlation operation results C1[d] to C4[d], and selects the phase difference AF processing unit 19.

Then, the system control unit 11 causes the phase difference AF processing unit 19 to determine the focusing position based on at least one of the correlation operation results C1[d] to C4[d], and moves the focus lens to the determined focusing position (step S71).

When J1<TH1 (step S64: NO) and J2<TH1 (step S68: NO), and when J2#J1 (step S69: NO), the system control unit 11 compares the size of J2 with the size of J1 in step S72.

As a result of the comparison in step S72, if J2>J1, since the reliability is high in the case of the phase difference AF using at least one of the correlation operation result C1[d] and the correlation operation result C2[d], the process of step S70 is performed.

On the other hand, if J2<J1, since the reliability is high in the case of the phase difference AF using at least one of the correlation operation result C3[d] and the correlation operation result C4[d], the process of step S67 is performed.

As described above, according to the operation example of FIG. 7, even when it is determined that the reliability is low using only one reliability determination value, if the reliability determined based on the other reliability determination value is high, the focus control based on the phase difference AF method may be performed. Thus, compared with the operation example of FIG. 4, it is possible to increase a possibility that the phase difference AF method is employed, to thereby perform AF at high speed.

Further, when two reliability determination values are smaller than the threshold value TH1 and the two reliability determination values are different from each other, it is possible to determine the focusing positions based on the correlation operation result where the reliability determination value is small, and thus, it is possible to increase the determination accuracy of the focusing position.

In addition, when the two reliability determination values are smaller than the threshold value TH1 and are the same values, in the process of step S71 in FIG. 7, it is possible to determine the focusing position using four correlation operation results to the maximum, and thus, it is possible to increase the determination accuracy of the focusing position.

Hereinbefore, the correlation operation result is used as a matching rate of two images respectively captured by two pixel pairs that form a pair line. As the matching rate, information other than the correlation operation result may be used.

Specifically, in this case, the phase difference AF processing unit 19 that functions as a matching rate generation unit generates a ratio between an integrated value of detection signals of the phase difference detection pixels 52A and an integrated value of detection signals of the phase difference detection pixels 52B, output from the entire pixel pairs P1 that form the pair line, as a matching rate of two images captured by the entire pixel pairs P1.

Similarly, in this case, the phase difference AF processing unit 19 that functions as the matching rate generation unit generates a ratio between an integrated value of detection signals of the phase difference detection pixels 52A and an integrated value of detection signals of the phase difference detection pixels 52B, output from the entire pixel pairs P2 that form the pair line, as a matching rate of two images captured by the entire pixel pairs P2.

When the spatial frequency of the subject image formed in the pair line is low, the integrated value of the detection signals of the phase difference detection pixels 52A of the entire pixel pairs P1 and the integrated value of the detection signals of the phase difference detection pixels 52B of the entire pixel pairs P1 become approximately the same value when a difference due to phase differences between the images captured by the phase difference detection pixels 52A and the images captured by the phase difference detection pixels 52B is excluded.

Further, the integrated value of the detection signals of the phase difference detection pixels 52A of the entire pixel pairs P2 and the integrated value of the detection signals of the phase difference detection pixels 52B of the entire pixel pairs P2 become approximately the same value when a difference due to phase differences is excluded.

On the other hand, as shown in FIG. 8, when a subject portion including a straight line L is formed in the pair line, the integrated value of the detection signals of the phase difference detection pixels 52A of the entire pixel pairs P1 and the integrated value of the detection signals of the phase difference detection pixels 52B of the entire pixel pairs P1 become greatly different values even when the difference due to the phase differences is excluded.

Further, the integrated value of the detection signals of the phase difference detection pixels 52A of the entire pixel pairs P2 and the integrated value of the detection signals of the phase difference detection pixels 52B of the entire pixel pairs P2 become greatly different values even when the difference due to the phase differences is excluded.

In this way, with only comparison between the integrated value in the phase difference detection pixels 52A and the integrated value in the phase difference detection pixels 52B in the same pixel pairs, it is difficult to determine whether the difference of the integrated values is generated by the phase differences or by a high-frequency subject.

In all of the pixel pairs P1 and the pixel pairs P2, the same phase difference occurs in captured images. Using this fact, by subtracting the ratio between the integrated value of the detection signals of the phase difference detection pixels 52A and the integrated value of the detection signals of the phase difference detection pixels 52B, in the pixel pair P2, from the ratio between the integrated value of the detection signals of the phase difference detection pixels 52A and the integrated value of the detection signals of the phase difference detection pixels 52B, in the pixel pair P1, it is possible to cancel out the difference of the integrated values due to the phase difference. If the difference of the integrated values due to the phase difference can be canceled out, it is possible to determine the presence or absence of the straight line L as shown in FIG. 8.

Thus, the phase difference AF processing unit 19 generates a reliability determination value J3 for determining reliability of a focus control based on the phase difference AF method using detection signals of the phase difference detection pixels 52A and the phase difference detection pixels 52B included in the pair line, using the following operation expression (4).

$$J3 = \left| \frac{\Sigma P1A}{\Sigma P1B} - \frac{\Sigma P2A}{\Sigma P2B} \right| \quad (4)$$

In Expression (4), ΣP1A represents an integrated value of detection signals of the phase difference detection pixels 52A that belong to the entire pixel pairs P1 disposed in a pair line.

ΣP1B represents an integrated value of detection signals of the phase difference detection pixels 52B that belong to the entire pixel pairs P1 disposed in a pair line.

ΣP2A represents an integrated value of detection signals of the phase difference detection pixels 52A that belong to the entire pixel pairs P2 disposed in a pair line.

ΣP2B represents an integrated value of detection signals of the phase difference detection pixels 52B that belong to the entire pixel pairs P2 disposed in a pair line.

When the value of J3 is large, it is possible to determine that the straight line L is present as shown in FIG. 8. When the straight line L is present, it is difficult to calculate a defocus amount with high accuracy using a correlation operation between the detection signals of the phase difference detection pixels 52A and the detection signals of the phase difference detection pixels 52B.

Thus, the system control unit 11 compares the value of J3 with a predetermined threshold value TH2. When J3≥TH2, it is determined that the reliability of the phase difference AF is low. Further, when J3<TH2, it is determined that the reliability of the phase difference AF is high.

Figure 9:
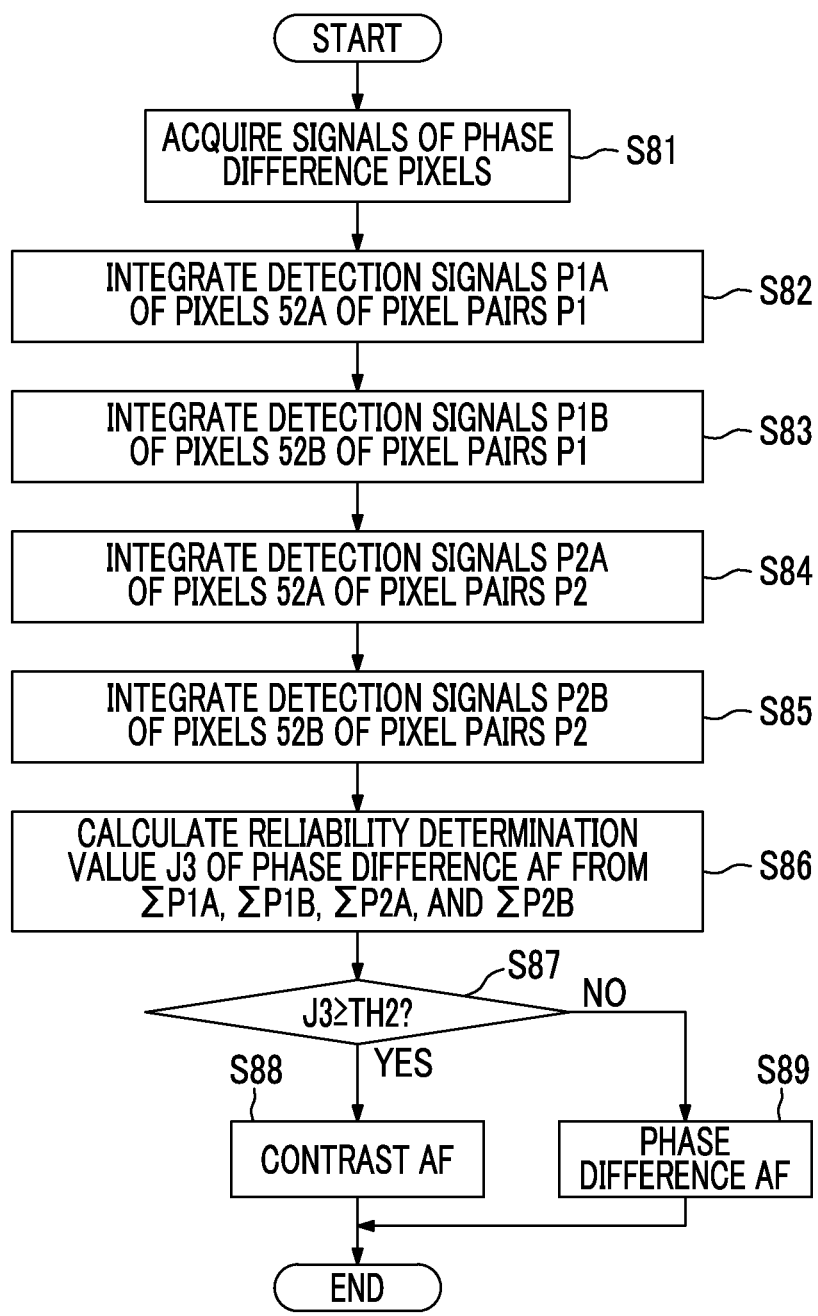
FIG. 9 is a flowchart illustrating a modification example of the AF operation of the digital camera shown in FIG. 1.

FIG. 9 is a flowchart illustrating a modification example of the AF operation of the digital camera shown in FIG. 1.

If there is an AF instruction, first, the phase difference AF processing unit 19 acquires detection signals of the phase difference detection pixels 52A and the phase difference detection pixels 52B disposed in a selected AF area 53 (step S81).

Then, the phase difference AF processing unit 19 integrates output signals of the phase difference detection pixels 52A of the pixel pairs P1 that form one pair line among the acquired detection signals to obtain an integrated value ΣP1A (step S82).

Then, the phase difference AF processing unit 19 integrates output signals of the phase difference detection pixels 52B of the pixel pairs P1 that form one pair line among the acquired detection signals to obtain an integrated value ΣP1B (step S83).

Then, the phase difference AF processing unit 19 integrates output signals of the phase difference detection pixels 52A of the pixel pairs P2 that form one pair line among the acquired detection signals to obtain an integrated value ΣP2A (step S84).

Then, the phase difference AF processing unit 19 integrates output signals of the phase difference detection pixels 52B of the pixel pairs P2 that form one pair line among the acquired detection signals to obtain an integrated value ΣP2B (step S85).

Then, the phase difference AF processing unit 19 generates the reliability determination value J3 by an operation of Expression (4) based on ΣP1A, ΣP1B, ΣP2A, and ΣP2B (step S86).

After the reliability determination value J3 is generated in step S86, the system control unit 11 compares the reliability determination value J3 with the threshold value TH2. When J3≥TH2 (step S87: YES), the system control unit 11 determines that the reliability of the focus control based on the phase difference AF method is low. Then, the system control unit 11 selects the contrast AF processing unit 18, determines the focusing position using the contrast AF processing unit 18, and performs the focus control of the imaging lens 1 according to the determined focusing position (step S88).

When J3<TH2 (step S87: NO), the system control unit 11 determines that the reliability of the focus control based on the phase difference AF method is high.

Then, the system control unit 11 selects the phase difference AF processing unit 19, determines the focusing position using the phase difference AF processing unit 19, and performs the focus control of the imaging lens 1 according to the determined focusing position (step S89).

When there are plural pair lines in the selected AF area 53, the phase difference AF processing unit 19 generates the reliability determination value J3 by performing the processes of steps S82 to S86 for each pair line.

When there is a pair line where the reliability determination value J3 is smaller than the threshold value TH2 among the plural pair lines, the system control unit 11 determines that the reliability of the focus control based on the phase difference AF method is high with respect to the selected AF area 53. Then, in step S89, the system control unit 11 determines the focusing position using detection signals read from the pair line where the reliability determination value J3 is smaller than the threshold value TH2.

Here, when there are plural pair lines where the reliability determination value J3 is smaller than the threshold value TH2, the phase difference AF processing unit 19 determines the focusing position based on an average of defocus amounts calculated for each pair line, for example.

When there is no pair line where the reliability determination value J3 is smaller than the threshold value TH2 among the plural pair lines, the system control unit 11 determines that the reliability of the focus control based on the phase difference AF method is low with respect to the selected AF area 53, and performs the process of step S88.

As described above, according to the operation example shown in FIG. 9, it is possible to determine the reliability of the phase difference AF without performing the correlation operation, to thereby perform the reliability determination at high speed.

Further, even when the reliability of the phase difference AF is low and the digital camera transitions to the focus control based on the contrast AF method, it is possible to reduce computation corresponding to omission of the correlation operation, to thereby reduce power consumption.

When the reliability determination value is calculated based on the ratio between the integrated value of the detection signals of the phase difference detection pixels 52A and the integrated value of the detection signals of the phase difference detection pixels 52B, similarly, it is possible to generate the reliability determination value using the pixel pairs set in the pair line as P3 and P4 instead of P1 and P2.

Further, using P1 and P2, and P3 and P4 as the pixel pairs set in the pair line, the reliability determination value J3 may be calculated with respect to the pixel pairs P1 and P2, a reliability determination value J4 may be calculated with respect to the pixel pairs P3 and P4. Then, whether the phase difference AF is to be performed may be determined based on the reliability determination values J3 and J4. Hereinafter, an operation of the digital camera in this case will be described.

Figure 10:
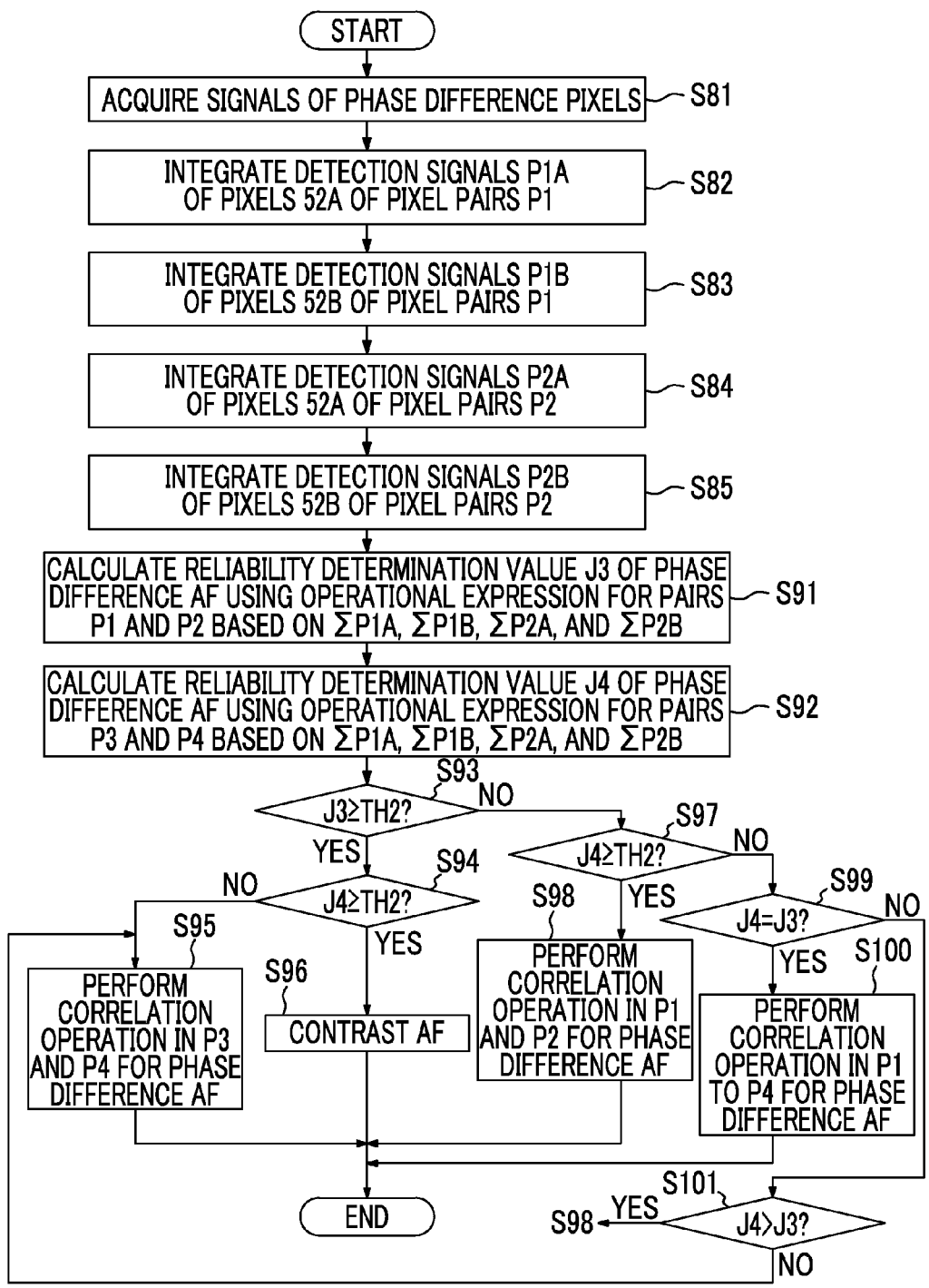
FIG. 10 is a flowchart illustrating a modification example of the AF operation of the digital camera shown in FIG. 1.

FIG. 10 is a flowchart illustrating a modification example of the AF operation of the digital camera shown in FIG. 1. In FIG. 10, the same reference numerals are given to the same processes as the processes shown in FIG. 9, and description thereof will not be repeated.

After step S85, the phase difference AF processing unit 19 generates the reliability determination value J3 by an operation of Expression (4) based on ΣP1A, ΣP1B, ΣP2A, and ΣP2B (step S91).

Then, the phase difference AF processing unit 19 generates the reliability determination value J4 by an operation of Expression (5) based on ΣP1A, ΣP1B, ΣP2A, and ΣP2B (step S92).

$$J4 = \left| \frac{\Sigma P3A}{\Sigma P3B} - \frac{\Sigma P4A}{\Sigma P4B} \right| \quad (5)$$

In Expression (5), ΣP3A represents an integrated value of detection signals of the phase difference detection pixels 52A that belong to the entire pixel pairs P3 disposed in a pair line, which is the same value as ΣP1A.

ΣP3B represents an integrated value of detection signals of the phase difference detection pixels 52B that belong to the entire pixel pairs P3 disposed in a pair line, which is the same value as ΣP2B.

ΣP4A represents an integrated value of detection signals of the phase difference detection pixels 52A that belong to the entire pixel pairs P4 disposed in a pair line, which is the same value as ΣP2A.

ΣP4B represents an integrated value of detection signals of the phase difference detection pixels 52B that belong to the entire pixel pairs P4 disposed in a pair line, which is the same value as ΣP1B.

Then, when J3≥TH2 (step S93: YES) and J4≥TH2 (step S94: YES), the system control unit 11 determines that the reliability of each of the focusing position determined by the correlation operation results (the above-described C1[d]) of the detection signals of the phase difference detection pixels 52A and 52B of the pixel pair P1, the focusing position determined by the correlation operation results (the above-described C2[d]) of the detection signals of the phase difference detection pixels 52A and 52B of the pixel pair P2, the focusing position determined by the correlation operation results (the above-described C3[d]) of the detection signals of the phase difference detection pixels 52A and 52B of the pixel pair P3, and the focusing position determined by the correlation operation results (the above-described C4[d]) of the detection signals of the phase difference detection pixels 52A and 52B of the pixel pair P4 is low, and selects the contrast AF processing unit 18 to perform the focus control (step S96).

When J3≥TH2 (step S93: YES) and J4<TH2 (step S94: NO), the system control unit 11 determines that the reliability of each of the focusing position determined by the correlation operation results C3[d] and the focusing position determined by the correlation operation results C4[d] is high, and selects the phase difference AF processing unit 19.

Then, the system control unit 11 causes the phase difference AF processing unit 19 to determine the focusing position based on at least one of the correlation operation result C3[d] and the correlation operation result C4[d], and moves the focus lens to the determined focusing position (step S95).

When J3<TH2 (step S93: NO) and J4≥TH2 (step S97: YES), the system control unit 11 determines that the reliability of each of the focusing position determined by the correlation operation result C1[d] and the focusing position determined by the correlation operation result C2[d] is high, and selects the phase difference AF processing unit 19.

Further, the system control unit 11 causes the phase difference AF processing unit 19 to determine the focusing position based on at least one of the correlation operation result C1[d] and the correlation operation result C2[d], and moves the focus lens to the determined focusing position (step S98).

When J3<TH2 (step S93: NO) and J4<TH2 (step S97: NO), and when J3=J4 (step S99: YES), the system control unit 11 determines that the reliability of the focusing position determined by each of the correlation operation results C1[d] to C4[d] is high, and selects the phase difference AF processing unit 19.

Then, the system control unit 11 causes the phase difference AF processing unit 19 to determine the focusing position based on at least one of the correlation operation results C1[d] to C4[d], and moves the focus lens to the determined focusing position (step S100).

When J3<TH2 (step S93: NO) and J4<TH2 (step S97: NO), and when J4≠J3 (step S99: NO), the system control unit 11 compares the size of J4 with the size of J3 in step S101.

As a result of the comparison in step S101, if J4>J3, since the reliability is high in the case of the phase difference AF using the correlation operation results C1[d] and C2[d], the process of step S98 is performed. On the other hand, if J4<J3, since the reliability is high in the case of the phase difference AF using the correlation operation results C3[d] and C4[d], the process of step S95 is performed.

As described above, according to the operation example of FIG. 10, even when it is determined that the reliability is low using only one reliability determination value, if the reliability determined based on the other reliability determination value is high, the focus control based on the phase difference AF method may be performed. Thus, compared with the operation example of FIG. 9, it is possible to increase a possibility that the phase difference AF method is employed, to thereby perform AF at high speed.

In addition, in the process of step S100, it is possible to determine the focusing position using four correlation operation results to the maximum, and thus, it is possible to increase the determination accuracy of the focusing position.

Hereinbefore, an example in which two adjacent pixel lines that respectively include the phase difference detection pixels 52A and 52B disposed in the AF area 53 are used as one block, the detection signals of the respective phase difference detection pixels 52A and 52B disposed in the block are used, and the reliability determination of the focusing control based on the phase difference AF method using the detection signals is performed is shown.

As a modification example of the block, three or more pixel lines including phase detection pixels disposed in the AF area 53 may be used as one block, the detection signals of the respective phase difference detection pixels 52A and 52B disposed in the block may be used, and the reliability determination of the focus control based on the phase difference AF method using the detection signals may be performed. Hereinafter, a modification example of the array of the phase difference detection pixels in the block will be described.

First Modification Example of Array

Figure 11:
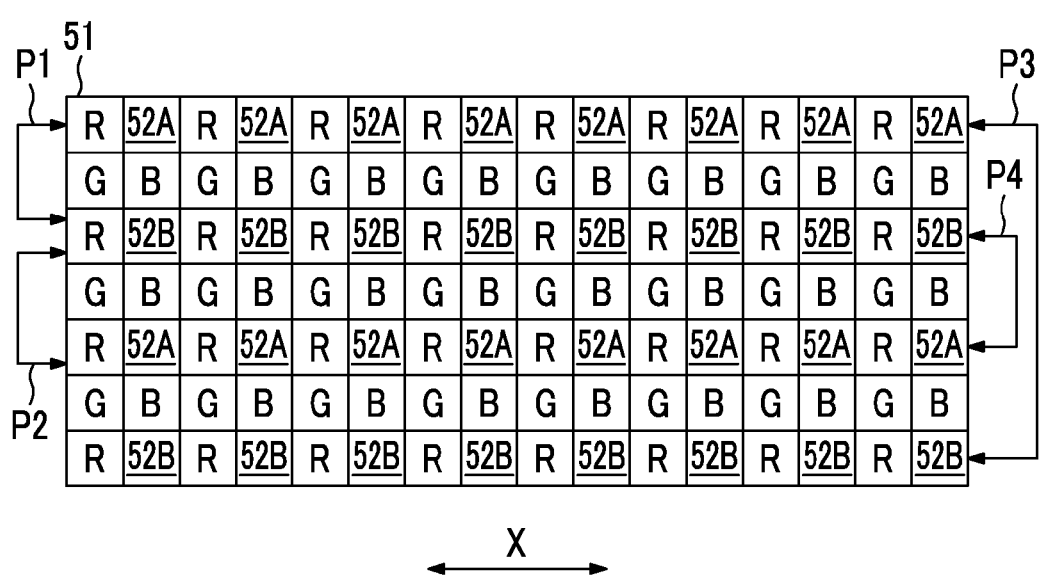
FIG. 11 is a diagram illustrating a modification example of an array of phase difference detection pixels 52A and 52B which are positioned at the AF area 53 of the solid-state imaging element 5 shown in FIG. 1.

FIG. 11 is a diagram illustrating a modification example of the array of the phase difference detection pixels 52A and 52B which are positioned in the AF area 53 of the solid-state imaging element 5 shown in FIG. 1.

In the array example shown in FIG. 11, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as one block. In the block, the pixels disposed at the same position in the row direction X are all disposed at such close positions as to receive a beam from the same subject.

In one block shown in FIG. 11, respective phase difference detection pixels included in phase difference pixel lines in odd-numbered rows are the phase difference detection pixels 52A, and respective phase difference detection pixels included in phase difference pixel lines in even-numbered rows are the phase difference detection pixels 52B.

In the array example shown in FIG. 11, each phase difference detection pixel 52A in the phase difference pixel line in the first row in the block and each phase difference detection pixel 52B adjacently disposed at a one-pixel interval with respect to each phase difference detection pixel 52A in the downward direction form a pixel pair P1.

Further, each phase difference detection pixel 52A in the phase difference pixel line in the third-row in the block and each phase difference detection pixel 52B adjacently disposed at a one-pixel interval with respect to each phase difference detection pixel 52A in the upward direction form a pixel pair P2.

Further, each phase difference detection pixel 52A in the first-row phase difference pixel line in the block and each phase difference detection pixel 52B adjacently disposed at a five-pixel interval with respect to each phase difference detection pixel 52A in the downward direction form a pixel pair P3.

Further, each phase difference detection pixel 52A in the third-row phase difference pixel line in the block and each phase difference detection pixel 52B adjacently disposed at a one-pixel interval with respect to each phase difference detection pixel 52A in the upward direction form a pixel pair P4.

In the array example of FIG. 11, since ΣP1B in the operation example of FIG. 10 is the same as ΣP2B, the phase difference AF processing unit 19 integrates detection signals of the phase difference detection pixels 52B of the pixel pairs P3 to calculate ΣP3B, instead of step S85 in FIG. 8. Further, in step S92, the phase difference AF processing unit 19 substitutes ΣP3A (=ΣP1A), ΣP3B, ΣP4A (=ΣP2A), and ΣP4B (=ΣP1B) in Expression (5) to calculate the reliability determination value J4.

When the array in FIG. 11 is applied to the operation of FIG. 10, each phase difference detection pixel 52A in the phase difference pixel line in the first row in the block and each phase difference detection pixel 52B adjacently disposed at a one-pixel interval with respect to each phase difference detection pixel 52A in the downward direction may form a pixel pair P4, and each phase difference detection pixel 52A in the phase difference pixel line in the third row in the block and each phase difference detection pixel 52B adjacently disposed at a one-pixel interval with respect to each phase difference detection pixel 52A in the downward direction may form a pixel pair P3.

According to the array example of FIG. 11, since the array is an array of phase difference detection pixels which is generally used, the array may be easily applied to a known solid-state imaging element, which enhances versatility.

Second Modification Example of Array

Figure 12:
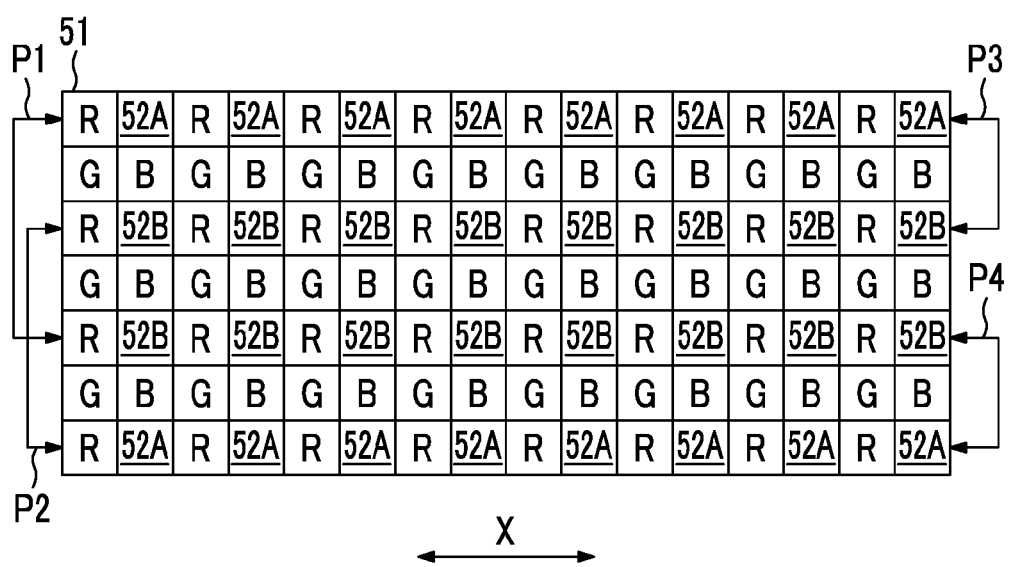
FIG. 12 is a diagram illustrating a modification example of the array of the phase difference detection pixels 52A and 52B which are positioned at the AF area 53 of the solid-state imaging element 5 shown in FIG. 1.

FIG. 12 is a diagram illustrating a modification example of the array of the phase difference detection pixels 52A and 52B which are positioned in the AF area 53 of the solid-state imaging element 5 shown in FIG. 1.

In the array example shown in FIG. 12, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as one block.

In one block shown in FIG. 12, each phase difference pixel included in the phase difference pixel lines in the first row and the fourth row is the phase difference detection pixel 52A, and each phase difference pixel included in the phase difference pixel lines in the second row and the third row is the phase difference detection pixel 52B.

In the array example shown in FIG. 12, each phase difference detection pixel 52A in the phase difference pixel line in the first row in the block and each phase difference detection pixel 52B adjacently disposed at a three-pixel interval with respect to each phase difference detection pixel 52A in the downward direction form a pixel pair P1.

Further, each phase difference detection pixel 52A in the phase difference pixel line in the fourth row in the block and each phase difference detection pixel 52B adjacently disposed at a three-pixel interval with respect to each phase difference detection pixel 52A in the upward direction form a pixel pair P2.

Further, each phase difference detection pixel 52A in the phase difference pixel line in the first row in the block and each phase difference detection pixel 52B adjacently disposed at a one-pixel interval with respect to each phase difference detection pixel 52A in the downward direction form a pixel pair P3.

Further, each phase difference detection pixel 52A in the phase difference pixel line in the fourth row in the block and each phase difference detection pixel 52B adjacently disposed at a one-pixel interval with respect to each phase difference detection pixel 52A in the upward direction form a pixel pair P4.

According to the array example shown in FIG. 12, since the pixel pairs P1 and P2, and the pixel pairs P3 and P4 have the same distance between two phase difference detection pixels that form each pixel pair, respectively, it is possible to perform the reliability determination with high accuracy, compared with the example shown in FIG. 11.

Further, since the distance between two phase difference pixels that form the pixel pair corresponds to three pixels at most, it is possible to perform the reliability determination with high accuracy, compared with the example shown in FIG. 11.

Third Modification Example of Array

Figure 13:
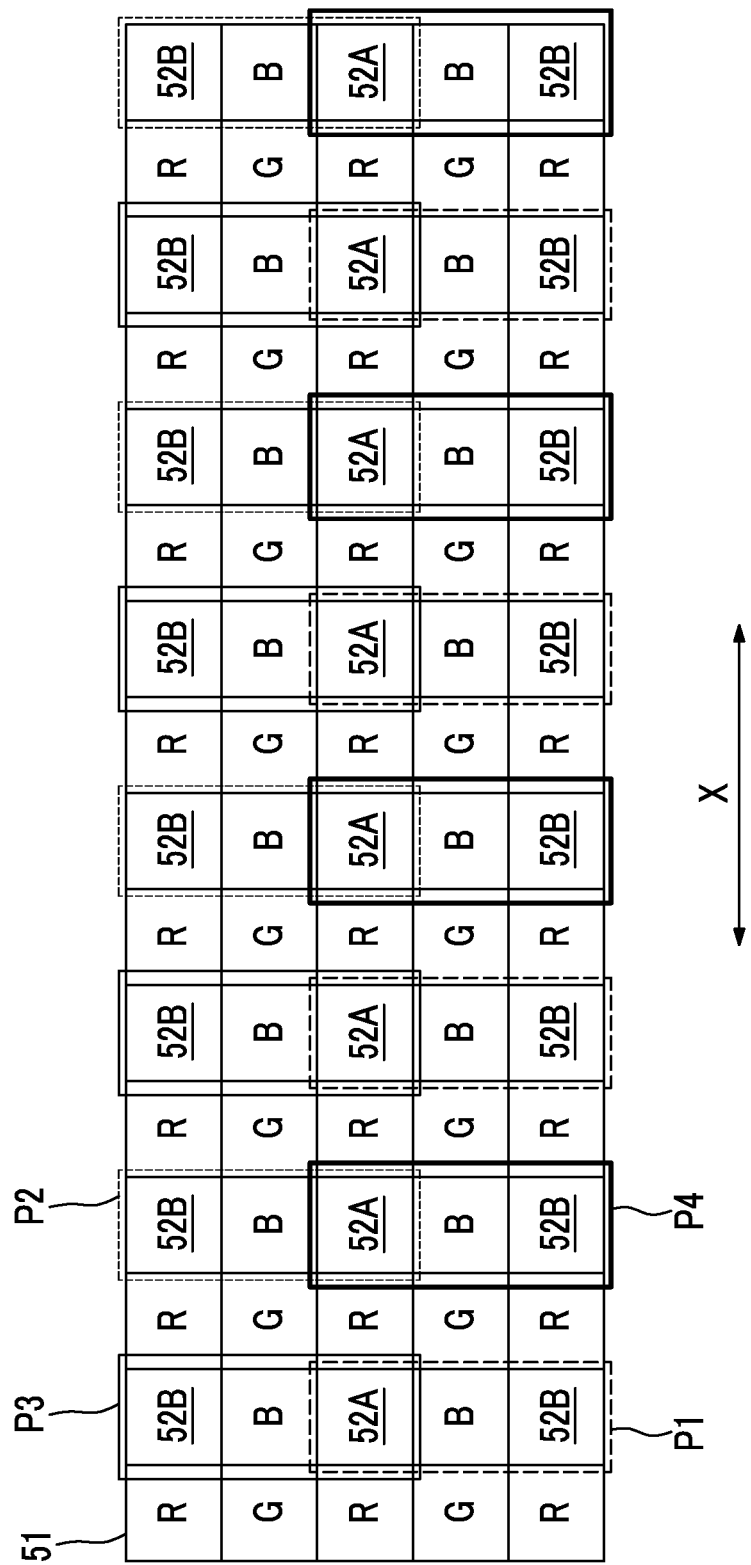
FIG. 13 is a diagram illustrating a modification example of the array of the phase difference detection pixels 52A and 52B which are positioned at the AF area 53 of the solid-state imaging element 5 shown in FIG. 1.

FIG. 13 is a diagram illustrating a modification example of the array of the phase difference detection pixels 52A and 52B which are positioned at the AF area 53 of the solid-state imaging element 5 shown in FIG. 1.

In the array example shown in FIG. 13, two phase difference pixel lines including plural phase difference detection pixels 52B arranged in the row direction X, and one phase difference pixel line including plural phase difference detection pixels 52A arranged in the row direction X are provided in the AF area 53, and the reliability determination is performed using the three phase difference pixel lines as one block. In the block, the pixels disposed at the same position in the row direction X are all disposed at such close positions as to receive a beam from the same subject.

In the array example shown in FIG. 13, each phase difference detection pixel 52A disposed in an odd column among the phase difference detection pixels 52A in the phase difference pixel line in the second row in the block and each phase difference detection pixel 52B adjacently disposed at a one-pixel interval with respect to each phase difference detection pixel 52A in the downward direction form a pixel pair P1.

Further, each phase difference detection pixel 52A disposed in an even column among the phase difference detection pixels 52A in the phase difference pixel line in the second row in the block and each phase difference detection pixel 52B adjacently disposed at a one-pixel interval with respect to each phase difference detection pixel 52A in the upward direction form a pixel pair P2.

Each phase difference detection pixel 52A disposed in the odd column among the phase difference detection pixels 52A in the phase difference pixel line in the second row in the block and each phase difference detection pixel 52B adjacently disposed at a one-pixel interval with respect to each phase difference detection pixel 52A in the upward direction form a pixel pair P3.

Each phase difference detection pixel 52A disposed in the even column among the phase difference detection pixels 52A in the phase difference pixel line in the second row in the block and each phase difference detection pixel 52B adjacently disposed at a one-pixel interval with respect to each phase difference detection pixel 52A in the downward direction form a pixel pair P4.

According to the array example shown in FIG. 13, since the reliability determination is performed using three phase difference pixel lines as one block, it is possible to reduce the number of phase difference pixel lines used for the reliability determination compared with that in the array examples of FIG. 11 and FIG. 12.

Further, since the pixel pairs P1 and P2, and the pixel pairs P3 and P4 have the same distance between two phase difference detection pixels that form each pixel pair, respectively, it is possible to perform the reliability determination with high accuracy, compared with the example shown in FIG. 11.

Further, since the distance between two phase difference detection pixels that form each pixel pair corresponds to one pixel at most, it is possible to perform the reliability determination with high accuracy, compared with the examples shown in FIGS. 11 and 12.

Fourth Modification Example of Array

Figure 14:
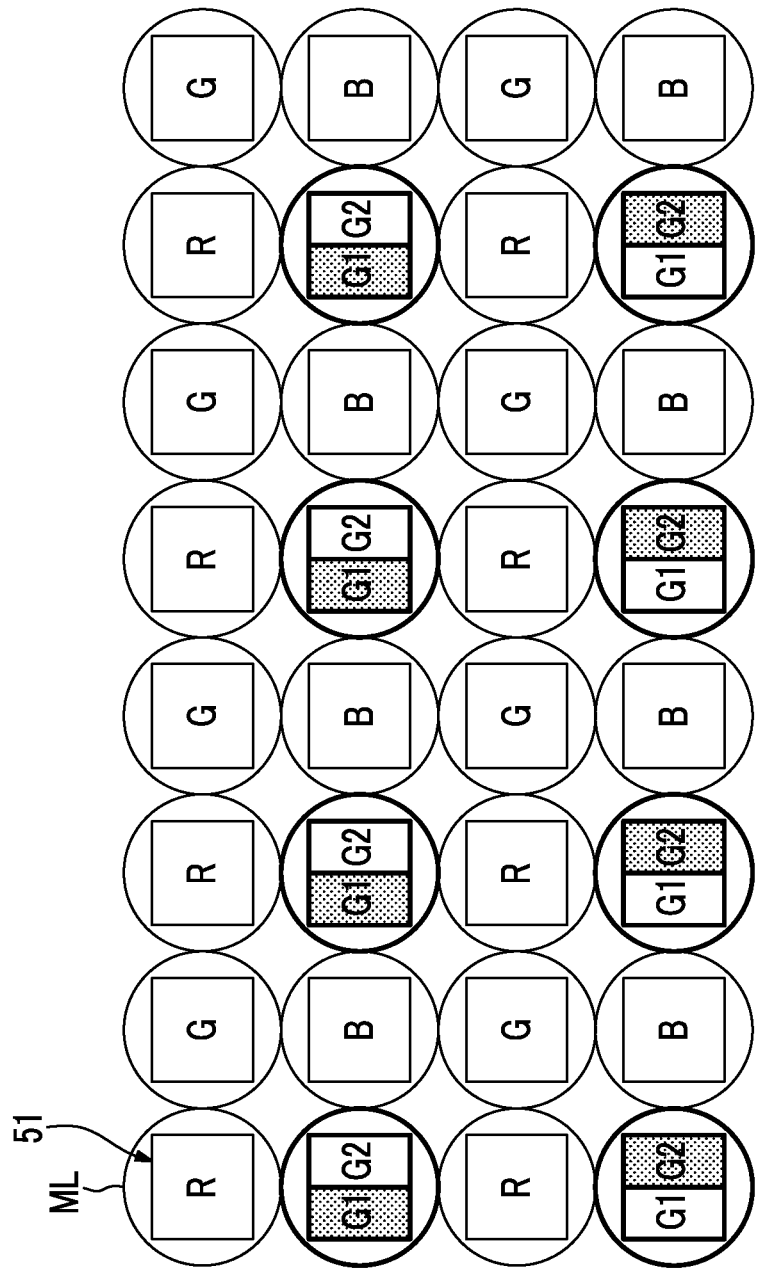
FIG. 14 is a diagram illustrating a modification example of the configuration of the AF area 53 of the solid-state imaging element 5 shown in FIG. 1.

FIG. 14 is a diagram illustrating a modification example of the configuration of the AF area 53 of the solid-state imaging element 5 shown in FIG. 1.

In the array example shown in FIG. 14, a photoelectric conversion portion of each of some G pixels 51 disposed in the AF area 53 is divided into two parts, in which the left part ("G1" pixel) among the two-divided parts of the photoelectric conversion portion is set as the phase difference detection pixel 52A, and the right part ("G2" pixel) among the two-divided pixels is set as the phase difference detection pixel 52B.

One micro lens 51 is provided in each pixel 51, and one micro lens 51 is also provided over the phase difference detection pixel 52A and the phase difference detection pixel 52B obtained by dividing the photoelectric conversion portion of one pixel 51 into two parts.

Thus, a configuration in which the phase difference detection pixel 52A receives a beam that passes through a half of a pupil region of the imaging lens 1 and the phase difference detection pixel 52B receives a beam that passes through the remaining half of the pupil region of the imaging lens 1 is obtained.

In this array example, two phase difference pixel lines where the pixels 51 that includes the phase difference detection pixel 52A and the phase difference detection pixel 52B are arranged in the row direction X are provided in the column direction Y, in the AF area 53, and the reliability determination is performed using the two phase difference pixel lines as one block. In the block, the micro lenses ML disposed at the same position in the row direction X are all disposed at such close positions as to receive a beam from the same subject.

In the array example shown in FIG. 14, each phase difference detection pixel 52A (shaded pixel in the figure) in the phase difference pixel line in the first row in the block and the phase difference detection pixel 52B (shaded pixel in the figure) in the phase difference pixel line in the second row adjacently disposed on a diagonally lower right side with respect to each phase difference detection pixel 52A are set as a pixel pair P1.

Further, each phase difference detection pixel 52A (non-shaded pixel in the figure) in the phase difference pixel line in the second row in the block and the phase difference detection pixel 52B (non-shaded pixel in the figure) in the phase difference pixel line in the first row adjacently disposed on a diagonally upper right side with respect to each phase difference detection pixel 52A are set as a pixel pair P2.

Further, each phase difference detection pixel 52A in the phase difference pixel line in the first row in the block and the phase difference detection pixel 52B rightward adjacent to each phase difference detection pixel 52A are set as a pixel pair P3.

In addition, each phase difference detection pixel 52A in the phase difference pixel line in the second row in the block and the phase difference detection pixel 52B rightward adjacent to each phase difference detection pixel 52A are set as a pixel pair P4.

In the array shown in FIG. 14, when the pixel 51 divided into the phase difference detection pixel 52A and the phase difference detection pixel 52B is used as an imaging pixel, a signal obtained by adding a detection signal of the phase difference detection pixel 52A to a detection signal of the phase difference detection pixel 52B may be considered as a signal output from the pixel 51.

Further, in the array shown in FIG. 14, a configuration in which the entire pixels 51, instead of some G pixels 51, are divided into two parts may be used. In this case, it is possible to change pixel pairs used for the reliability determination according to colors of subjects, to thereby perform the phase difference AF with high accuracy.

In addition, in the configuration in which the entire pixels 51 are divided into two parts, it is also possible to perform the reliability determination for each color, and to perform the phase difference AF using phase difference detection pixels of colors for which high reliability is obtained, and thus, it is possible to increase a possibility that the phase difference AF is performed, or to enhance the accuracy of the phase difference AF.

According to the array example shown in FIG. 14, since a configuration in which the phase difference detection pixel 52A and the phase difference detection pixel 52B are provided under one micro lens ML is used, it is possible to increase the number of imaging pixels, compared with a configuration in which the micro lens ML is individually provided for the phase difference detection pixel 52A and the phase difference detection pixel 52B. Further, in imaging, since signals from the phase difference detection pixel 52A and the phase difference detection pixel 52B disposed at the approximately the same position are added to obtain a signal corresponding to one pixel, a pixel interpolation process is not necessary, to thereby make it possible to enhance the quality of a captured image.

Hereinbefore, when the determination result in step S45 of FIG. 5 is YES, the determination result in step S65 in FIG. 7 is YES, the determination result in step S87 in FIG. 9 is YES, and the determination result in step S94 in FIG. 10 is YES, the focus control based on the contrast AF method is performed, but the invention is not limited thereto. For example, in this case, a message indicating that AF cannot be performed may be notified to the user.

In this description, an example in which the digital camera is used as the image capture device is shown, but hereinafter, an embodiment in which a smart phone with a camera is used as the image capture device will be described.

Figure 15:
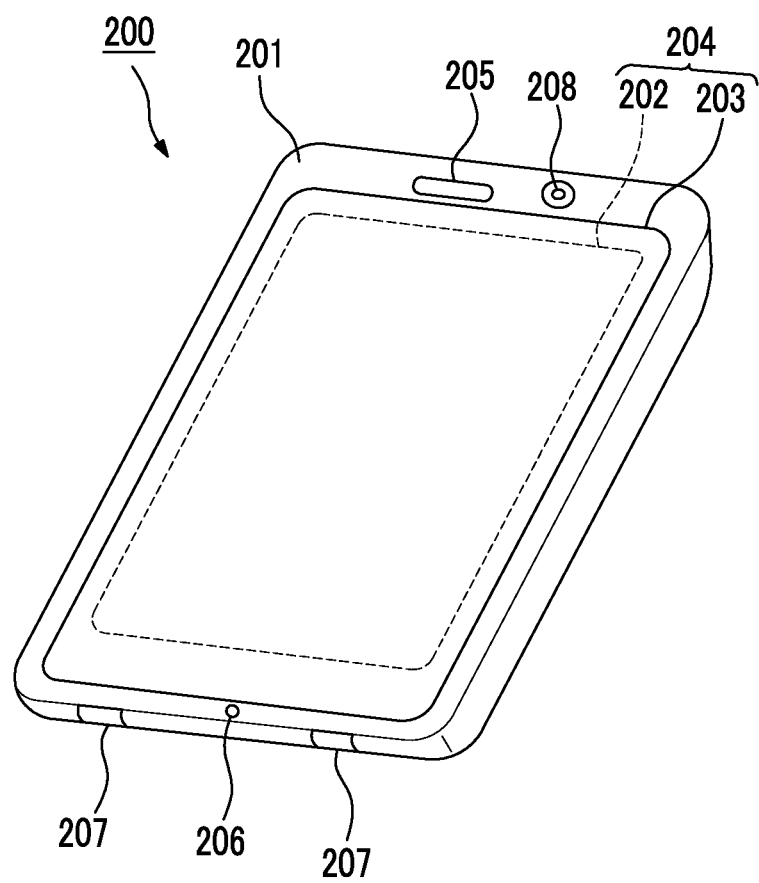
FIG. 15 is a diagram illustrating a smart phone which is an image capture device.

FIG. 15 is a diagram illustrating an appearance of a smart phone 200 which is an embodiment of the image capture device of the invention. The smart phone 200 shown in FIG. 15 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, in the housing 201, a speaker 205, a microphone 206, an operation unit 207, and a camera unit 208 are provided. The configuration of the housing 201 is not limited thereto, and for example, a configuration in which the display unit and the input unit are independently provided may be employed, or a configuration in which a folding structure or a slide mechanism is provided may be employed.

Figure 16:
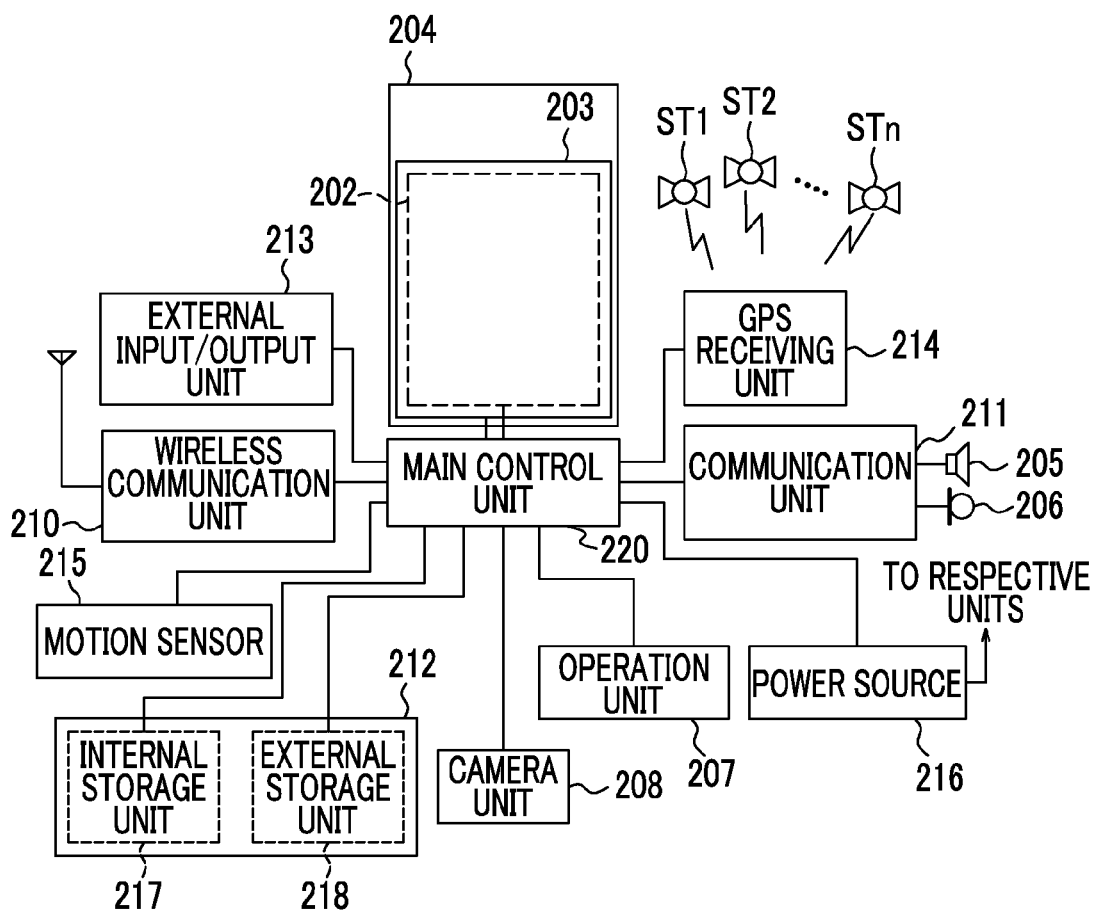
FIG. 16 is an internal block diagram of the smart phone shown in FIG. 15.

FIG. 16 is a block diagram illustrating a configuration of the smart phone 200 shown in FIG. 15. As shown in FIG. 15, as main components of the smart phone, a wireless communication unit 210, the display input unit 204, a communication unit 211, the operation unit 207, the camera unit 208, a storage unit 212, and an external input/output unit 213, a global positioning system (GPS) receiving unit 214, a motion sensor 215, a power source 216, and a main control unit 220 are provided. Further, as main functions of the smart phone 200, a wireless communication function for performing mobile wireless communication through a base station BS (not shown) and a mobile communication network NW (not shown) is provided.

The wireless communication unit 210 performs wireless communication with the base station BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (static image and moving image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device that is mounted so that an image displayed on a display surface of the display panel 202 can be visually recognized and detects one or plural coordinates operated by a user's finger or a stylus. If the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 15, the display panel 202 and the operation panel 203 of the smart phone 200 shown as an example of the image capture device of the invention are integrated to form the display input unit 204, in which the operation panel 203 is arranged to completely cover the display panel 202.

When such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an inductive coupling type, an electromagnetic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 15, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 15, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable memory slot. Each of the respective internal storage section 217 and the external storage section 218 that form the storage unit 212 is realized using a storage medium such as a flash memory, a hard disk, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module (SIM) card or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including a latitude, a longitude and an altitude. When position information can be acquired from the wireless communication unit 210 or the external input/output unit 213 (for example, wireless LAN), the GPS receiving unit 214 can also detect the position using the position information.

The motion sensor 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mails, a Web browsing function for browsing Web pages, or the like is used.

Further, the main control unit 220 has an image processing function, for example, for displaying an image on the display input unit 204 based on image data (data on a static image or a moving image) such as received data or downloaded streaming data. The image processing function refers to a function for decoding the image data by the main control unit 220, performing image processing with respect to the decoded image data, and displaying an image on the display input unit 204.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 15, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. Further, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor 215, or the like may be added to image data on a static image or a moving image, and the result may be recorded in the storage unit 212, or may be output through the input/output unit 213 or the wireless communication unit 210.

In the smart phone 200 with the above-described configuration, similarly, by using the solid-state imaging element 5 as the imaging element of the camera unit 208, and by performing the processes shown in FIGS. 5, 7, 9 and 10 in the main control unit 220, it is possible to perform the phase difference AF at high speed with high accuracy.

As described above, this specification discloses the following content.

According to a disclosure, there is provided an image capture device that includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams, and the image capture device includes: a focus control unit that performs a focus control of the imaging optical system using a phase difference AF method that uses detection signals of the first signal detection unit and the second signal detection unit; a matching rate generation unit that generates a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generates a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, generates a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair, and generates a fourth matching rate which is a matching rate of two images captured by a fourth pair which is a pair in which the second signal detection unit that forms a pair together with the first signal detection unit in the second pair is changed to form a combination different from that of the pair for calculating the second matching rate, using detection signals of the respective signal detection units of the fourth pair; and a reliability determination unit that determines reliability of the focus control based on the phase difference AF method that uses the detection signals of the respective signal detection units of each of the first pair, the second pair, the third pair, and the fourth pair based on the first matching rate, the second matching rate, the third matching rate, and the fourth matching rate.

According to this configuration, it is possible to determine the reliability of the focus control based on the phase difference AF method only using the signals of the signal detection units, and thus, it is possible to perform the reliability determination at high speed. Further, even when it is determined that the reliability is low only using the first matching rate and the second matching rate, for example, if the reliability determined based on the third matching rate and the fourth matching rate is high, it is possible to determine that the focus control based on the phase difference AF method may be performed. Thus, when the phase difference AF method and the contrast AF method are used in combination, it is possible to increase a possibility that the phase difference AF method is employed, to thereby perform AF at high speed.

According to another disclosure, there is provided an image capture device that includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams, and the image capture device includes: a focus control unit that performs a focus control of the imaging optical system using a phase difference AF method that uses detection signals of the first signal detection unit and the second signal detection unit; a matching rate generation unit that generates a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generates a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, and generates a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair; and a reliability determination unit that determines reliability of the focus control based on the phase difference AF method that uses the detection signals of the respective signal detection units of each of the first pair, the second pair, and the third pair based on the first matching rate, the second matching rate, and the third matching rate.

According to this configuration, it is possible to determine the reliability of the focus control based on the phase difference AF method using only the signals of the signal detection units, and thus, it is possible to perform the reliability determination at high speed. Further, even when it is determined that the reliability is low only using the first matching rate and the second matching rate, for example, if the reliability determined based on the second matching rate and the third matching rate is high, it is possible to determine that the focus control based on the phase difference AF method may be performed. Thus, when the phase difference AF method and the contrast AF method are used in combination, it is possible to increase a possibility that the phase difference AF method is employed, to thereby perform AF at high speed.

In the above-disclosed image capture device, the imaging element includes a plurality of signal detection unit pairs of the first signal detection units and the second signal detection units arranged in a direction that intersects the detection direction with respect to the first signal detection units, the plurality of signal detection unit pairs include a first signal detection unit pair and a second signal detection unit pair in which positional relationships between the first signal detection units and the second signal detection units are reverse to each other, the imaging element includes a plurality of pair lines in which the first signal detection unit pair and the second signal detection unit pair are alternately arranged in the detection direction, and the matching rate generation unit sets the first signal detection unit pair included in an arbitrary pair line among the pair lines as the first pair, sets the second signal detection unit pair included in the arbitrary pair line as the second pair, sets, in a state where the signal detection units included in the arbitrary pair line are divided into two groups including the signal detection units disposed at the same position in a direction orthogonal to the detection direction, one group as the third pair, and sets the other group as the fourth pair, to calculate the first matching rate, the second matching rate, the third matching rate, and the fourth matching rate.

According to this configuration, it is possible to determine the reliability using the detection signals of the signal detection units included in two closest lines among the lines including the signal detection units, and thus, it is possible to perform the reliability determination with high accuracy. Further, it is possible to reduce the number of lines which are detection signal reading targets for the reliability determination to the minimum, to thereby shorten time for the reliability determination.

In the above-disclosed image capture device, the matching rate generation unit divides an AF area set on an imaging surface of the imaging element into a plurality of blocks, calculates, using the detection signals of the respective signal detection units of each pair included in each block, the matching rate of two images captured by the pair in the block, the reliability determination unit determines the reliability based on the matching rate for each block, and the focus control unit performs the focus control based on the phase difference AF method using the detection signals of the signal detection units included in a block other than a block for which it is determined that the reliability is lower than a threshold value, among the plurality of blocks.

According to this configuration, it is possible to perform the focus control based on the phase difference AF method while excluding a block where the reliability is low in the AF area, to thereby increase the accuracy of the focus control.

In the above-disclosed image capture device, the matching rate generation unit generates a correlation operation result between the detection signal groups output from every two signal detection unit groups that form the pair as the matching rate of two images captured by the pair.

According to this configuration, when the reliability is high and the focus control based on the phase difference AF method is performed, it is possible to perform the focus control based on the phase difference AF method using the correlation operation results which are calculated in advance, to thereby perform focusing on a main subject at high speed.

In the above-disclosed image capture device, the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

According to this configuration, it is possible to determine the reliability of the focus control based on the phase difference AF method without performing a correlation operation, and thus, it is possible to perform the reliability determination at high speed. Further, for example, even when the reliability is low, and for example, the focus control based on the phase difference AF method is not performed or transitions to the focus control based on the contrast AF method, it is possible to reduce computation corresponding to omission of the correlation operation, to thereby reduce power consumption.

According to still another disclosure, there is provided a focus control method in an image capture device that includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams, and the focus control method includes: a focus control step of performing a focus control of the imaging optical system using a phase difference AF method that uses detection signals of the first signal detection unit and the second signal detection unit; a matching rate generation step of generating a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generating a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, generating a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair, and generating a fourth matching rate which is a matching rate of two images captured by a fourth pair which is a pair in which the second signal detection unit that forms a pair together with the first signal detection unit in the second pair is changed to form a combination different from that of the pair for calculating the second matching rate, using detection signals of the respective signal detection units of the fourth pair; and a reliability determination step of determining reliability of the focus control based on the phase difference AF method that uses the detection signals of the respective signal detection units of each of the first pair, the second pair, the third pair, and the fourth pair based on the first matching rate, the second matching rate, the third matching rate, and the fourth matching rate.

According to this method, it is possible to determine the reliability of the focus control based on the phase difference AF method only using the signals of the signal detection units, and thus, it is possible to perform the reliability determination at high speed. Further, even when it is determined that the reliability is low only using the first matching rate and the second matching rate, for example, if the reliability determined based on the third matching rate and the fourth matching rate is high, it is possible to determine that the focus control based on the phase difference AF method may be performed. Thus, when the phase difference AF method and the contrast AF method are used in combination, it is possible to increase a possibility that the phase difference AF method is employed, to thereby perform AF at high speed.

According to still another disclosure, there is provided a focus control method in an image capture device that includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams, and the focus control method includes: a focus control step of performing a focus control of the imaging optical system using a phase difference AF method that uses detection signals of the first signal detection unit and the second signal detection unit; a matching rate generation step of generating a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generating a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, and generating a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair; and a reliability determination step of determining reliability of the focus control based on the phase difference AF method that uses the detection signals of the respective signal detection units of each of the first pair, the second pair, and the third pair based on the first matching rate, the second matching rate, and the third matching rate.

According to this method, it is possible to determine the reliability of the focus control based on the phase difference AF method using only the signals of the signal detection units, and thus, it is possible to perform the reliability determination at high speed. Further, even when it is determined that the reliability is low only using the first matching rate and the second matching rate, for example, if the reliability determined based on the second matching rate and the third matching rate is high, it is possible to determine that the focus control based on the phase difference AF method may be performed. Thus, when the phase difference AF method and the contrast AF method are used in combination, it is possible to increase a possibility that the phase difference AF method is employed, to thereby perform AF at high speed.

INDUSTRIAL APPLICABILITY

The present invention is applied to a digital camera or the like to provide high convenience and effectiveness.

EXPLANATION OF REFERENCES

1: imaging lens
2: diaphragm
5: solid-state imaging element
11: system control unit (reliability determination unit)
18: contrast AF processing unit
19: phase difference AF processing unit (matching rate generation unit)
50: light receiving surface
51: pixel
52, 52A, 52B: phase difference detection pixel
53: AF area
P1, P2, P3, P4: pixel pair

What is claimed is:

1. An image capture device that has an imaging element that images a subject through an imaging optical system, the imaging element including a first signal detection unit that detects a signal based on one beam among a pair of beams that passes through different portions in a pupil region of the imaging optical system, and a second signal detection unit that detects a signal based on the other beam among the pair of beams, and the image capture device comprising:
   a focus control unit that performs a focus control of the imaging optical system using a phase difference AF method that uses detection signals of the first signal detection unit and the second signal detection unit;
   a matching rate generation unit that generates a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generates a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, generates a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair, and generates a fourth matching rate which is a matching rate of two images captured by a fourth pair which is a pair in which the second signal detection unit that forms a pair together with the first signal detection unit in the second pair is changed to form a combination different from that of the pair for calculating the second matching rate, using detection signals of the respective signal detection units of the fourth pair; and a reliability determination unit that determines reliability of the focus control based on the phase difference AF method that uses the detection signals of the respective signal detection units of each of the first pair, the second pair, the third pair, and the fourth pair based on the first matching rate, the second matching rate, the third matching rate, and the fourth matching rate.

2. The image capture device according to claim 1, wherein the imaging element includes a plurality of signal detection unit pairs of the first signal detection units and the second signal detection units arranged in a direction that intersects the detection direction with respect to the first signal detection units, wherein the plurality of signal detection unit pairs include a first signal detection unit pair and a second signal detection unit pair in which positional relationships between the first signal detection units and the second signal detection units are reverse to each other, wherein the imaging element has a plurality of pair lines in which the first signal detection unit pair and the second signal detection unit pair are alternately arranged in the detection direction, and wherein the matching rate generation unit sets the first signal detection unit pair included in an arbitrary pair line among the pair lines as the first pair, sets the second signal detection unit pair included in the arbitrary pair line as the second pair, sets, in a state where the signal detection units included in the arbitrary pair line are divided into two groups including the signal detection units disposed at the same position in a direction orthogonal to the detection direction, one group as the third pair, and sets the other group as the fourth pair, to calculate the first matching rate, the second matching rate, the third matching rate, and the fourth matching rate.

3. The image capture device according to claim 2, wherein the matching rate generation unit divides an AF area set on an imaging surface of the imaging element into a plurality of blocks, and calculates, using the detection signals of the respective signal detection units of each pair included in each block, the matching rate of two images captured by the pair in the block, wherein the reliability determination unit determines the reliability based on the matching rate for each block, and wherein the focus control unit performs the focus control based on the phase difference AF method using the detection signals of the signal detection units included in a block other than a block for which it is determined that the reliability is lower than a threshold value, among the plurality of blocks.

4. The image capture device according to claim 3, wherein the matching rate generation unit generates a correlation operation result between the detection signal groups output from every two signal detection unit groups that form the pair as the matching rate of two images captured by the pair.

5. The image capture device according claim 3, wherein the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

6. The image capture device according to claim 2, wherein the matching rate generation unit generates a correlation operation result between the detection signal groups output from every two signal detection unit groups that form the pair as the matching rate of two images captured by the pair.

7. The image capture device according claim 2, wherein the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

8. The image capture device according to claim 1, wherein the matching rate generation unit divides an AF area set on an imaging surface of the imaging element into a plurality of blocks, and calculates, using the detection signals of the respective signal detection units of each pair included in each block, the matching rate of two images captured by the pair in the block, wherein the reliability determination unit determines the reliability based on the matching rate for each block, and wherein the focus control unit performs the focus control based on the phase difference AF method using the detection signals of the signal detection units included in a block other than a block for which it is determined that the reliability is lower than a threshold value, among the plurality of blocks.

9. The image capture device according to claim 8, wherein the matching rate generation unit generates a correlation operation result between the detection signal groups output from every two signal detection unit groups that form the pair as the matching rate of two images captured by the pair.

10. The image capture device according claim 8, wherein the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

11. The image capture device according to claim 1,
wherein the matching rate generation unit generates a correlation operation result between the detection signal groups output from every two signal detection unit groups that form the pair as the matching rate of two images captured by the pair.

12. The image capture device according claim 1,
wherein the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

13. A focus control method in the image capture device according to claim 1 that has the imaging element that images a subject through an imaging optical system, the imaging element including the first signal detection unit that detects a signal based on one beam among a pair of beams that passes through different portions in a pupil region of the imaging optical system, and the second signal detection unit that detects a signal based on the other beam among the pair of beams, and the focus control method comprising:
a focus control step of performing a focus control of the imaging optical system using a phase difference AF method that uses detection signals of the first signal detection unit and the second signal detection unit;
a matching rate generation step of generating a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generating a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, generating a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair, and generating a fourth matching rate which is a matching rate of two images captured by a fourth pair which is a pair in which the second signal detection unit that forms a pair together with the first signal detection unit in the second pair is changed to form a combination different from that of the pair for calculating the second matching rate, using detection signals of the respective signal detection units of the fourth pair; and
a reliability determination step of determining reliability of the focus control based on the phase difference AF method that uses the detection signals of the respective signal detection units of each of the first pair, the second pair, the third pair, and the fourth pair based on the first matching rate, the second matching rate, the third matching rate, and the fourth matching rate.

14. A focus control method in the image capture device according to claim 1 that has the imaging element that images a subject through an imaging optical system, the imaging element including the first signal detection unit that detects a signal based on one beam among a pair of beams that passes through different portions in a pupil region of the imaging optical system, and the second signal detection unit that detects a signal based on the other beam among the pair of beams, and the focus control method comprising:
a focus control step of performing a focus control of the imaging optical system using a phase difference AF method that uses detection signals of the first signal detection unit and the second signal detection unit;
a matching rate generation step of generating a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generating a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, and generating a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair; and
a reliability determination step of determining reliability of the focus control based on the phase difference AF method that uses the detection signals of the respective signal detection units of each of the first pair, the second pair, and the third pair based on the first matching rate, the second matching rate, and the third matching rate.

15. An image capture device that has an imaging element that images a subject through an imaging optical system, the imaging element including a first signal detection unit that detects a signal based on one beam among a pair of beams that passes through different portions in a pupil region of the imaging optical system, and a second signal detection unit that detects a signal based on the other beam among the pair of beams, and the image capture device comprising:
- a focus control unit that performs a focus control of the imaging optical system using a phase difference AF method that uses detection signals of the first signal detection unit and the second signal detection unit;
- a matching rate generation unit that generates a first matching rate which is a matching rate of two images captured by a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, using detection signals of the respective signal detection units of the first pair, generates a second matching rate which is a matching rate of two images captured by a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in the same direction with respect to the respective signal detection units of the second signal detection unit group, using detection signals of the respective signal detection units of the second pair, and generates a third matching rate which is a matching rate of two images captured by a third pair which is a pair in which the second signal detection unit that forms a pair together with the first signal detection unit in the first pair is changed to form a combination different from that of the pair for calculating the first matching rate, using detection signals of the respective signal detection units of the third pair; and
- a reliability determination unit that determines reliability of the focus control based on the phase difference AF method that uses the detection signals of the respective signal detection units of each of the first pair, the second pair, and the third pair based on the first matching rate, the second matching rate, and the third matching rate.

16. The image capture device according to claim 15,
wherein the matching rate generation unit divides an AF area set on an imaging surface of the imaging element into a plurality of blocks, and calculates, using the detection signals of the respective signal detection units of each pair included in each block, the matching rate of two images captured by the pair in the block,
wherein the reliability determination unit determines the reliability based on the matching rate for each block, and
wherein the focus control unit performs the focus control based on the phase difference AF method using the detection signals of the signal detection units included in a block other than a block for which it is determined that the reliability is lower than a threshold value, among the plurality of blocks.

17. The image capture device according to claim 16,
wherein the matching rate generation unit generates a correlation operation result between the detection signal groups output from every two signal detection unit groups that form the pair as the matching rate of two images captured by the pair.

18. The image capture device according claim 16,
wherein the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

19. The image capture device according to claim 15,
wherein the matching rate generation unit generates a correlation operation result between the detection signal groups output from every two signal detection unit groups that form the pair as the matching rate of two images captured by the pair.

20. The image capture device according claim 15,
wherein the matching rate generation unit generates a ratio between an integrated value of the detection signals of the first signal detection units and an integrated value of the detection signals of the second signal detection units, output from two signal detection unit groups that form the pair, as the matching rate of two images captured by the pair.

* * * * *